(12) United States Patent
Fei et al.

(10) Patent No.: US 12,342,280 B2
(45) Date of Patent: Jun. 24, 2025

(54) RANDOM ACCESS METHOD AND APPARATUS

(71) Applicant: HUAWEI TECHNOLOGIES CO., LTD., Guangdong (CN)

(72) Inventors: Yongqiang Fei, Shenzhen (CN); Juan Zheng, Beijing (CN); Hailong Hou, Beijing (CN); Chaojun Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 375 days.

(21) Appl. No.: 17/860,911

(22) Filed: Jul. 8, 2022

(65) Prior Publication Data

US 2022/0346014 A1 Oct. 27, 2022

Related U.S. Application Data

(63) Continuation of application No. PCT/CN2020/071541, filed on Jan. 10, 2020.

(51) Int. Cl.
*H04W 52/02* (2009.01)
*H04W 68/00* (2009.01)
*H04W 74/0833* (2024.01)

(52) U.S. Cl.
CPC ..... *H04W 52/0229* (2013.01); *H04W 68/005* (2013.01); *H04W 74/0833* (2013.01)

(58) Field of Classification Search
CPC ........... H04W 52/0229; H04W 68/005; H04W 74/0833; H04W 52/0216; H04W 52/0245;
(Continued)

(56) References Cited

U.S. PATENT DOCUMENTS

2013/0121303 A1 5/2013 Cho et al.
2021/0022202 A1* 1/2021 Kim ...................... H04W 76/27
(Continued)

FOREIGN PATENT DOCUMENTS

CN 107734690 A 2/2018
CN 108282849 A 7/2018
(Continued)

OTHER PUBLICATIONS

Interdigital Inc., "Discussion on Procedures for Initial Access and Mobility in NR-U," 3GPP TSG RAN WG1 Meeting #95, R1-1813221, Spokane, USA, Nov. 12-16, 2018, 12 pages.
(Continued)

*Primary Examiner* — Rownak Islam
(74) *Attorney, Agent, or Firm* — Fish & Richardson P.C.

(57) ABSTRACT

A random access method and an apparatus. In one example: A terminal device receives a first wake-up signal, and then determines N random access channel occasions based on a correspondence between the first wake-up signal and the N random access channel occasions. The terminal device determines a first random access channel occasion in the N random access channel occasions, and sends a random access preamble on the first random access channel occasion. A network device uses, as a reception beam, a beam used to send the first wake-up signal, to receive the random access preamble sent by the terminal device.

18 Claims, 7 Drawing Sheets

(58) Field of Classification Search
CPC ..... H04B 7/0617; H04L 5/005; H04L 5/0051; H04L 5/0053; Y02D 30/70
USPC ......................................................... 370/323
See application file for complete search history.

(56) References Cited

U.S. PATENT DOCUMENTS

| | | | | |
|---|---|---|---|---|
| 2021/0051759 A1* | 2/2021 | Zhou | ................ | H04W 52/0206 |
| 2021/0368444 A1* | 11/2021 | Wang | ................ | H04W 52/0232 |
| 2022/0086786 A1* | 3/2022 | Narasimha | ........ | H04W 74/0833 |
| 2022/0394617 A1* | 12/2022 | Li | ....................... | H04W 52/028 |

FOREIGN PATENT DOCUMENTS

| | | |
|---|---|---|
| EP | 3493626 A1 | 6/2019 |
| WO | 2018175760 A1 | 9/2018 |
| WO | 2019061369 A1 | 4/2019 |

OTHER PUBLICATIONS

PCT International Search Report and Written Opinion issued in International Application No. PCT/CN2020/071541 on Sep. 27, 2020, 13 pages (with English translation).
Extended European Search Report issued in European Application No. 20912464.3 on Oct. 14, 2022, 7 pages.

* cited by examiner (a) If the WUS is detected, listen to a paging message on N subsequent POs (b) If the WUS is not detected, there is no need to listen to a paging message on N subsequent POs

RANDOM ACCESS METHOD AND APPARATUS

CROSS-REFERENCE TO RELATED APPLICATIONS

This application is a continuation of International Application No. PCT/CN2020/071541, filed on Jan. 10, 2020, the disclosure of which is hereby incorporated by reference in its entirety.

TECHNICAL FIELD

This application relates to the field of communication technologies, and in particular, to a random access method and an apparatus.

BACKGROUND

In a new radio (NR) communication system, a network device may send a paging message to a terminal device that is in idle mode, sleeping mode, or inactive mode, to page the terminal device. Downlink control information (DCI) for scheduling the paging message is also referred to as paging DCI, and may be sent on a paging occasion (PO). The terminal device may receive, detect, or listen to the paging DCI on the PO. The terminal device may receive, based on scheduling of the paging DCI, the paging message sent by the network device, to determine whether the network device pages the terminal device. For example, the paging message may include a paging list. If the paging list includes an identifier of the terminal device, the terminal device may determine that the network device pages the terminal device.

After the terminal device determines that the network device pages the terminal device, or when the terminal device expects to send uplink data to the network device, the terminal device may initiate random access. For example, the terminal device may send a random access preamble to the network device on a random access channel occasion (random access channel (RACH) occasion, RO). A manner in which the terminal device determines the RO on which the random access preamble is sent is a current research hotspot.

SUMMARY

Embodiments of this application provide a communication method and apparatus, so that a terminal device can determine an RO on which a random access preamble is sent.

According to a first aspect, a communication method is provided. The method may be performed by a terminal device, or may be performed by a component (for example, a processor, a chip, or a chip system) of the terminal device. The method includes: receiving a first wake-up signal from a network device, where the first wake-up signal is one of K wake-up signals, and K is an integer greater than or equal to 1; determining a first RO based on the first wake-up signal, where the first RO is one of N ROs, there is a correspondence between the first wake-up signal and the N ROs, and N is an integer greater than or equal to 1; and sending, by the terminal device, a random access preamble to the network device on the first RO. The random access preamble may also be referred to as a random access request, a preamble, a preamble carried on a physical random access channel (PRACH), a RACH preamble, a message 1 (Msg1), a message A (MsgA), or the like.

In a solution, there is a correspondence between a synchronization signal block (SSB) and an RO, and the terminal device sends the random access preamble on an RO corresponding to an SSB. A beam of the SSB is usually a wide beam in a fixed direction, resulting in disadvantages such as poor flexibility and a low beam gain. Therefore, when the network device receives the random access preamble by using the beam of the SSB, there are also disadvantages such as poor flexibility and a low beam gain. However, in the solution of the first aspect, there is a correspondence between a wake-up signal and an RO, and the terminal device sends the random access preamble on an RO corresponding to a wake-up signal. Correspondingly, the network device receives the random access preamble by using a beam of the wake-up signal. Compared with an SSB, a wake-up signal has advantages such as a narrower beam, high flexibility, and a high beam gain. Therefore, when the network device receives the random access preamble by using the beam corresponding to the wake-up signal, there are also advantages such as high flexibility and a high beam gain.

In a possible design, that there is a correspondence between the first wake-up signal and the N ROs may include one or more of the following: There is a correspondence between a time domain resource of the first wake-up signal and the N ROs; there is a correspondence between a frequency domain resource of the first wake-up signal and the N ROs; there is a correspondence between a code domain resource of the first wake-up signal and the N ROs; there is a correspondence between a spatial domain resource of the first wake-up signal and the N ROs; there is a correspondence between an identifier of the first wake-up signal and the N ROs; or there is a correspondence between a sequence of the first wake-up signal and the N ROs.

In the foregoing design, the correspondence between the first wake-up signal and the N ROs may be referred to as a direct correspondence between a wake-up signal and an RO. The direct correspondence between the first wake-up signal and the N ROs may be predefined, or may be configured by the network device. In this design, a quasi co-location relationship between a wake-up signal and another signal is not limited. For example, the first wake-up signal may have a specific beam direction. Therefore, the beam of the first wake-up signal is flexible, so that the network device can set a width and a direction of the beam of the first wake-up signal based on a requirement of the network device. This is not limited to a beam manner of another signal.

In a possible design, that there is a correspondence between the first wake-up signal and the N ROs may include one or more of the following: The first wake-up signal is quasi-co-located with a first synchronization signal block SSB, and there is a correspondence between the first SSB and the N ROs; the first wake-up signal is quasi-co-located with a first channel state information-reference signal CSI-RS, and there is a correspondence between the first CSI-RS and the N ROs; or the first wake-up signal is quasi-co-located with a first demodulation reference signal DMRS, and there is a correspondence between the first DMRS and the N ROs.

In the foregoing design, the correspondence between the first wake-up signal and the N ROs may be referred to as an indirect correspondence between a wake-up signal and an RO. The indirect correspondence between the first wake-up signal and the N ROs may be predefined, or may be configured by the network device. In this design, a quasi co-location relationship between the first wake-up signal and another signal (for example, the first SSB, the first CSI-RS, or the first DMRS) is used, so that the terminal device can optimize and/or adjust a reception beam of the first wake-up signal based on a measurement result of the first SSB, the first CSI-RS, the first DMRS, or the like. This reduces a probability of missed detection or false detection of the first wake-up signal.

In a possible design, that the first wake-up signal is one of K wake-up signals includes one or more of the following:

The first wake-up signal is a wake-up signal whose received signal power is the highest in the K wake-up signals; the first wake-up signal is a wake-up signal whose received power is greater than or equal to a first threshold in the K wake-up signals, where the first threshold may be predefined, or may be configured by the network device; the first wake-up signal is a wake-up signal whose received signal strength is the highest in the K wake-up signals; the first wake-up signal is a wake-up signal whose received signal strength is greater than or equal to a second threshold in the K wake-up signals, where the second threshold is predefined, or is configured by the network device; the first wake-up signal is a wake-up signal whose received signal quality is the highest in the K wake-up signals; or the first wake-up signal is a wake-up signal whose received signal quality is greater than or equal to a third threshold in the K wake-up signals, where the third threshold is predefined, or is configured by the network device.

In the foregoing design, processes in which the terminal device determines the first wake-up signal based on conditions such as the received signal power, the received signal strength, and the received signal quality are similar. The following uses an example in which the terminal device determines the first wake-up signal based on the received signal power for description. For example, in a possible implementation, the terminal device may detect received power of the K wake-up signals, and determine, as the first wake-up signal, a wake-up signal whose received power is the highest. In another possible implementation, the terminal device may detect received power of the K wake-up signals, and determine, as the first wake-up signal, a wake-up signal whose received power is greater than or equal to the first threshold in the K wake-up signals. It should be noted that, if there are a plurality of wake-up signals whose received power is greater than or equal to the first threshold in the K wake-up signals, the terminal device may randomly select a wake-up signal from the plurality of wake-up signals as the first wake-up signal, or may determine, as the first wake-up signal, a wake-up signal whose received power is the highest in the plurality of wake-up signals whose received power is greater than or equal to the first threshold.

It can be learned from the foregoing descriptions that the terminal device selects, from the K wake-up signals, a wake-up signal that meets the condition as the first wake-up signal. According to a beam reciprocity principle, the terminal device then uses, as an uplink beam, a reception beam used to receive the first wake-up signal, to send the random access preamble. Correspondingly, the network device uses, as a reception beam, a downlink beam used to send the first wake-up signal, to receive the random access preamble. A beam used to transmit the first wake-up signal and a beam used to transmit the random access preamble are a same beam. Therefore, when the selected first wake-up signal meets the foregoing condition such as highest received power, the transmitted random access preamble also meets the foregoing condition. For example, received power of the transmitted random access preamble is relatively high, or received power of the transmitted random access preamble is greater than or equal to a threshold, so that quality of transmitting the random access preamble can be improved.

In a possible design, K may be specifically an integer greater than or equal to 2.

In a possible design, the K wake-up signals may occupy different frequency domain resources. For example, the K wake-up signals may be frequency division multiplexed, and occupy a same time domain resource but different frequency domain resources. Frequency domain resources occupied by the wake-up signals have a same size or different sizes. An advantage is as follows: In a design of frequency division multiplexing, the wake-up signals may be sent in narrow bandwidth, so that the terminal device can detect the wake-up signals in the narrow bandwidth. This helps reduce detection complexity.

Alternatively, the K wake-up signals may occupy different time domain resources. For example, the K wake-up signals may be time division multiplexed, and occupy a same frequency domain resource but different time domain resources. Time domain resources occupied by the wake-up signals have a same size or different sizes. An advantage is as follows: In a design of time division multiplexing, the wake-up signals may be sent in some bandwidth, so that the terminal device can receive and detect different WUSs in the some bandwidth. In this way, the terminal device performs beam training or channel measurement based on the WUSs.

Alternatively, the K wake-up signals may be sent by using a combination of time division multiplexing and frequency division multiplexing. An advantage is as follows: The terminal device may perform narrowband receiving on a WUS. However, when the terminal device needs to receive WUSs from different locations at different time points, the terminal device may receive and detect the WUSs in a broadband manner, to perform beam training or channel measurement within a range of the broadband. In this way, the terminal device can select, based on a requirement of the terminal device, an appropriate manner of receiving the WUSs. This improves flexibility of WUS detection.

In a possible design, the first wake-up signal is used to indicate to monitor, on a paging occasion (PO), downlink control information (DCI) used for paging. For example, the network device may indicate, depending on whether to send the first wake-up signal, whether the terminal device is to monitor the paging DCI on the PO. If the terminal device detects the first wake-up signal, the terminal device may monitor the paging DCI on the PO. If the terminal device does not detect the first wake-up signal, the terminal device may not monitor the paging DCI on the PO. Therefore, the terminal device does not periodically detect the paging DCI on the PO, so that power consumption of the terminal device is reduced.

Alternatively, the first wake-up signal is used to indicate whether to monitor, on a PO, DCI used for paging. For example, the network device may indicate, by using different wake-up signals, whether the terminal device is to monitor the paging DCI on the PO. For example, the network device may use a wake-up signal 1 to indicate the terminal device to monitor the paging DCI on the PO, and use a wake-up signal 2 to indicate the terminal device not to monitor the paging DCI on the PO. When the first wake-up signal received by the terminal device is the wake-up signal 1, the terminal device monitors the paging DCI on the PO. When the first wake-up signal received by the terminal device is the wake-up signal 2, the terminal device does not monitor the paging DCI on the PO. Therefore, the terminal device does not periodically monitor the paging DCI on the PO, so that power consumption of the terminal device is reduced.

According to a second aspect, a communication method is provided. For beneficial effects of this aspect, refer to related records in the first aspect. Details are not described herein again. The method may be performed by a network device, or may be performed by a component (for example, a processor, a chip, or a chip system) of the network device. The method includes: sending a first wake-up signal to a terminal device, where the first wake-up signal is one of K wake-up signals, and K is an integer greater than or equal to 1; and receiving a random access preamble on a first RO, where the first RO is one of N ROs, there is a correspondence between the first wake-up signal and the N ROs, and N is an integer greater than or equal to 1. The random access preamble may also be referred to as a random access request, a preamble, a preamble carried on a physical random access channel (PRACH), a RACH preamble, a message 1 (Msg1), a message A (MsgA), or the like.

In a possible design, that there is a correspondence between the first wake-up signal and the N ROs includes one or more of the following: There is a correspondence between a time domain resource of the first wake-up signal and the N ROs; there is a correspondence between a frequency domain resource of the first wake-up signal and the N ROs; there is a correspondence between a code domain resource of the first wake-up signal and the N ROs; there is a correspondence between a spatial domain resource of the first wake-up signal and the N ROs; there is a correspondence between an identifier of the first wake-up signal and the N ROs; or there is a correspondence between a sequence of the first wake-up signal and the N ROs.

In the foregoing design, the correspondence between the first wake-up signal and the N ROs may be referred to as a direct correspondence. The direct correspondence may be predefined, or may be configured by the network device.

In a possible design, that there is a correspondence between the first wake-up signal and the N ROs includes one or more of the following: The first wake-up signal is quasi-co-located with a first synchronization signal block SSB, and there is a correspondence between the first SSB and the N ROs; the first wake-up signal is quasi-co-located with a first channel state information-reference signal CSI-RS, and there is a correspondence between the first CSI-RS and the N ROs; or the first wake-up signal is quasi-co-located with a first demodulation reference signal DMRS, and there is a correspondence between the first DMRS and the N ROs.

In the foregoing design, the correspondence between the first wake-up signal and the N ROs may be referred to as an indirect correspondence between a wake-up signal and an RO. The indirect correspondence between a wake-up signal and an RO may be predefined, or may be configured by the network device.

In a possible design, that the first wake-up signal is one of K wake-up signals includes one or more of the following: The first wake-up signal is a wake-up signal whose received signal power is the highest in the K wake-up signals; the first wake-up signal is one of wake-up signals whose received signal power is greater than or equal to a first threshold in the K wake-up signals; the first wake-up signal is a wake-up signal whose received signal strength is the highest in the K wake-up signals; the first wake-up signal is one of wake-up signals whose received signal strength is greater than or equal to a second threshold in the K wake-up signals; the first wake-up signal is a wake-up signal whose received signal quality is the highest in the K wake-up signals; or the first wake-up signal is one of wake-up signals whose received signal quality is greater than or equal to a third threshold in the K wake-up signals.

In a possible design, K is an integer greater than or equal to 2.

In a possible design, the K wake-up signals occupy different frequency domain resources. For example, the K wake-up signals may be frequency division multiplexed. Alternatively, the K wake-up signals occupy different time domain resources. For example, the K wake-up signals may be time division multiplexed. Alternatively, the K wake-up signals may occupy different frequency domain resources and different time domain resources. For example, the K wake-up signals are time division multiplexed and frequency division multiplexed.

In a possible design, the first wake-up signal is used to indicate to monitor, on a paging occasion, downlink control information used for paging, or the first wake-up signal is used to indicate whether to monitor, on a paging occasion, downlink control information used for paging.

According to a third aspect, an embodiment of this application provides an apparatus. The apparatus may implement the method according to any one of the first aspect or the possible implementations of the first aspect. The apparatus includes a corresponding unit or component configured to perform the foregoing method. The unit included in the apparatus may be implemented by using software and/or hardware. The apparatus may be, for example, a terminal, or a chip, a chip system, or a processor that can support the terminal in implementing the foregoing method.

According to a fourth aspect, an embodiment of this application provides an apparatus. The apparatus may implement the method according to any one of the second aspect or the possible implementations of the second aspect. The apparatus includes a corresponding unit or component configured to perform the foregoing method. The unit included in the apparatus may be implemented by using software and/or hardware. The apparatus may be, for example, a network device, or a chip, a chip system, or a processor that can support the network device in implementing the foregoing method.

According to a fifth aspect, an embodiment of this application provides an apparatus. The apparatus includes a processor. The processor is coupled to a memory. The memory is configured to store a program or instructions. When the program or the instructions are executed by the processor, the apparatus is enabled to implement the method according to any one of the first aspect or the possible implementations of the first aspect.

According to a sixth aspect, an embodiment of this application provides an apparatus. The apparatus includes a processor. The processor is coupled to a memory. The memory is configured to store a program or instructions. When the program or the instructions are executed by the processor, the apparatus is enabled to implement the method according to any one of the second aspect or the possible implementations of the second aspect.

According to a seventh aspect, an embodiment of this application provides a computer-readable storage medium. The computer-readable storage medium stores a computer program or instructions. When the computer program or the instructions are executed, a computer is enabled to perform the method according to any one of the first aspect or the possible implementations of the first aspect.

According to an eighth aspect, an embodiment of this application provides a computer-readable storage medium. The computer-readable storage medium stores a computer program or instructions. When the computer program or the instructions are executed, a computer is enabled to perform the method according to any one of the second aspect or the possible implementations of the second aspect.

According to a ninth aspect, an embodiment of this application provides a computer program product. The computer program product includes computer program code. When the computer program code is run on a computer, the computer is enabled to perform the method according to any one of the first aspect or the possible implementations of the first aspect.

According to a tenth aspect, an embodiment of this application provides a computer program product. The computer program product includes computer program code. When the computer program code is run on a computer, the computer is enabled to perform the method according to any one of the second aspect or the possible implementations of the second aspect.

According to an eleventh aspect, an embodiment of this application provides a chip. The chip includes a processor. The processor is coupled to a memory. The memory is configured to store a program or instructions. When the program or the instructions are executed by the processor, the chip is enabled to implement the method according to any one of the first aspect or the possible implementations of the first aspect.

According to a twelfth aspect, an embodiment of this application provides a chip. The chip includes a processor. The processor is coupled to a memory. The memory is configured to store a program or instructions. When the program or the instructions are executed by the processor, the chip is enabled to implement the method according to any one of the second aspect or the possible implementations of the second aspect.

According to a thirteenth aspect, an embodiment of this application provides a communication system. The communication system includes the apparatus according to the third aspect and/or the apparatus according to the fourth aspect; or includes the apparatus according to the fifth aspect and/or the apparatus according to the sixth aspect.

DESCRIPTION OF EMBODIMENTS

Figure 1:
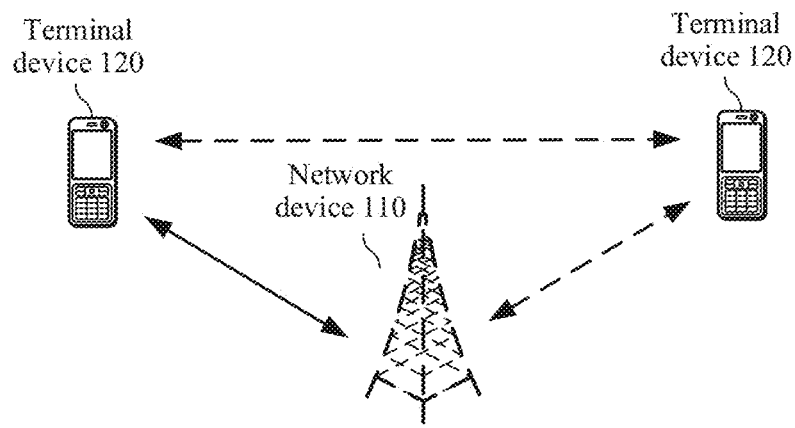
FIG. 1 is a schematic diagram of a communication system according to an embodiment of this application.

A method and an apparatus provided in embodiments of this application may be applied to a communication system. FIG. 1 is a schematic diagram of a structure of a communication system. The communication system 100 includes one or more network devices (only one network device 110 is shown in the figure for brevity), and one or more terminal devices that communicate with the one or more network devices. As shown in FIG. 1, the terminal device 120 communicates with the network device 110. It may be understood that the network device and the terminal device may also be referred to as communication devices.

Technologies described in embodiments of the present application may be applied to various communication systems, for example, a 4th generation (4G) communication system, a 4.5G communication system, a 5G communication system, a system converged by a plurality of communication systems, and a future evolved communication system (for example, a 6G communication system). The communication systems include, for example, a long term evolution (LTE) system, a new radio (NR) system, an internet of things system, an internet of vehicles system, a wireless fidelity (Wi-Fi) system, a communication system related to the 3rd generation partnership project (3GPP), and another communication system of this type.

In the communication system shown in FIG. 1, the network device 110 and the terminal device 120 may perform data transmission on a physical resource. The physical resource (which may also be referred to as a resource for short) in this application may include one or more of a time domain resource, a frequency domain resource, a code domain resource, or a spatial domain resource. For example, the time domain resource included in the physical resource may include at least one frame, at least one subframe, at least one slot, at least one mini-slot, at least one time unit, or at least one time domain symbol. For example, the frequency domain resource included in the physical resource may include at least one carrier, at least one component carrier (CC), at least one bandwidth part (BWP), at least one resource block group (RBG), at least one physical resource block group (PRG), at least one resource block (RB), or at least one subcarrier (SC). For example, the spatial domain resource included in the physical resource may include at least one beam, at least one port, at least one antenna port, or at least one layer/space layer. For example, the code domain resource included in the physical resource may include at least one orthogonal cover code (OCC) or at least one non-orthogonal multiple access (NOMA) code. It may be understood that the physical resource may be a physical resource of a baseband, and the physical resource of the baseband may be used by a baseband chip. Alternatively, the physical resource may be a physical resource of an air interface (which may also be referred to as an air interface resource). Alternatively, the physical resource may be a physical resource of an intermediate frequency or a radio frequency.

When the network device 110 and the terminal device 120 perform data transmission, the network device 110 may send control information to the terminal device 120 through a control channel, for example, a physical downlink control channel (PDCCH), to allocate a resource of a data channel, for example, a physical downlink shared channel (PDSCH) or a physical uplink shared channel (PUSCH), to the terminal device 120. For example, the control information may indicate a time domain symbol and/or a resource block (RB) corresponding to the resource of the data channel. The network device 110 and the terminal device 120 perform data transmission on the allocated resource through the data channel. The data transmission may include downlink data transmission and/or uplink data transmission, and the downlink data (for example, data carried in the PDSCH) transmission may be that the network device 110 sends data to the terminal device 120. The uplink data (for example, data carried on the PUSCH) transmission may be that the terminal device 120 sends data to the network device 110. The data may be data in a broad sense, for example, may be user data, or may be system information, broadcast information, or other information. This is not limited.

The terminal devices 120 may also communicate with each other, which may be generally referred to as device-to-device (D2D) communication. Data transmitted between the terminal devices 120 may be referred to as sidelink data or the like.

FIG. 1 shows one network device and two terminal devices as an example. Optionally, the communication system 100 may include a plurality of network devices, and another quantity of terminal devices may be included in coverage of one network device. This is not limited.

Figure 2:
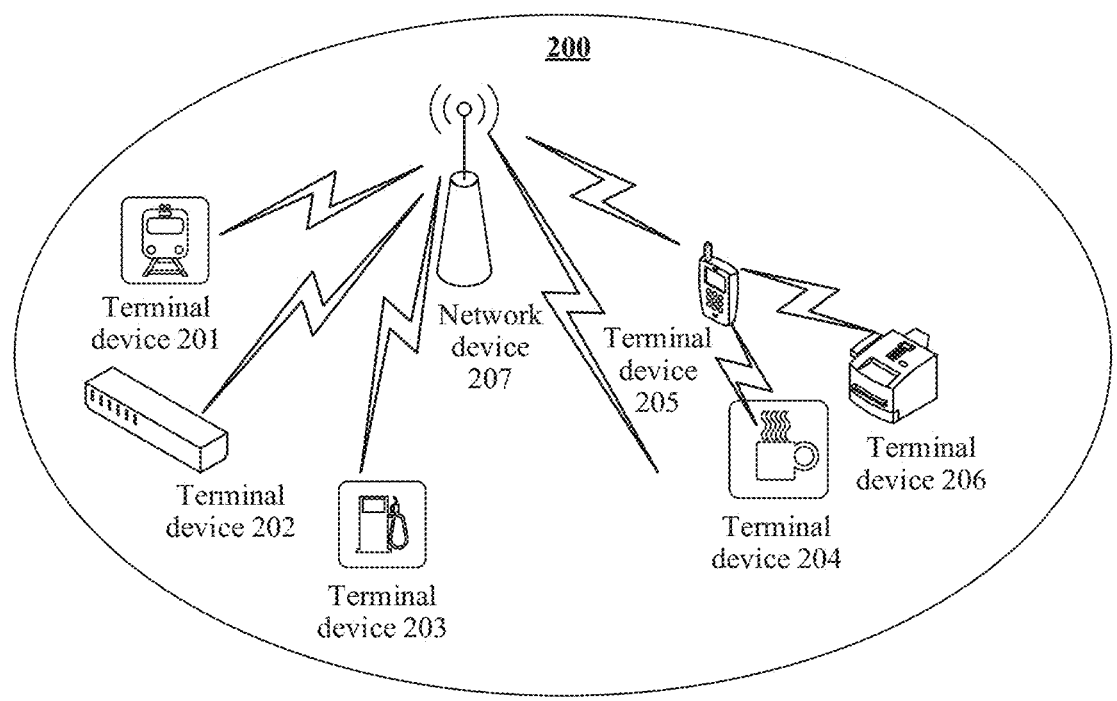
FIG. 2 is a schematic diagram of another communication system according to an embodiment of this application.

FIG. 2 shows another communication system 200 to which an embodiment of this application is applied. The communication system 200 includes a terminal device 201, a terminal device 202, a terminal device 203, a terminal device 204, a terminal device 205, a terminal device 206, and a network device 207.

In the communication system 200, at least one of the terminal device 201, the terminal device 202, the terminal device 203, the terminal device 204, the terminal device 205, or the terminal device 206 may send uplink data to the network device 207. The network device 207 may send downlink data to at least one of the terminal device 201, the terminal device 202, the terminal device 203, the terminal device 204, the terminal device 205, or the terminal device 206.

In the communication system, D2D communication may also be performed between the terminal devices. For example, the terminal device 205 may send sidelink data to the terminal device 204 and/or the terminal device 206, and the terminal device 204 and/or the terminal device 206 may send sidelink data to the terminal device 205.

It should be noted that the network device 207 may directly communicate with the terminal device 201 to the terminal device 206. For example, during downlink transmission, the network device 207 may directly send downlink data to at least one of the terminal device 201, the terminal device 202, the terminal device 203, or the terminal device 205. During uplink transmission, at least one of the terminal device 201, the terminal device 202, the terminal device 203, or the terminal device 205 may directly send uplink data to the network device 207. Alternatively, the network device 207 may indirectly communicate with the terminal device 201 to the terminal device 206. For example, the network device 207 may send data to the terminal device 205, and the terminal device 205 may forward the data to the terminal device 204 and/or the terminal device 206. Similarly, the terminal device 204 and/or the terminal device 206 may send data to the terminal device 205, and the terminal device 205 forwards the data to the network device 207 and the like.

FIG. 2 shows one network device and six terminal devices as an example. Optionally, the communication system 200 may include a plurality of network devices, and another quantity of terminal devices and the like may be included in coverage of one network device. This is not limited.

Based on the communication system shown in FIG. 1 or FIG. 2, an embodiment of this application provides an application scenario. A network device sends a paging message to page a terminal device. The paged terminal device may be in idle mode, sleeping mode, inactive mode, or the like. This is not limited. The paging may be initiated by an access network device, or may be initiated by a core network device. This is not limited in this embodiment of this application.

Downlink control information (DCI) for scheduling the paging message is paging DCI, and may be sent on a paging occasion (PO). The PO may be determined based on a paging search space and a corresponding control resource set. The paging search space is used to indicate a monitoring occasion of a PDCCH that can carry the downlink control information. The PDCCH monitoring occasion may be periodic or aperiodic. This is not limited. The corresponding control resource set is used to indicate a time-frequency resource of the PDCCH on the PDCCH monitoring occasion. One PO may include one or more PDCCH monitoring occasions. The plurality of PDCCH monitoring occasions may be consecutive or inconsecutive in time domain. This is not limited. The terminal device may determine a location of the PO based on an identifier of the terminal device, and receive, monitor, detect, or listen to (detect) the paging DCI at the location of PO. The terminal device may receive the paging message based on the paging DCI, to determine whether the network device pages the terminal device. The paging message may include a paging list, and the paging list includes the identifier of the paged terminal device. After receiving the paging message, the terminal device may determine whether the paging list includes the identifier of the terminal device. If the paging list includes the identifier of the terminal device, the terminal device may determine that the network device pages the terminal device, and then initiate a random access procedure, that is, send a random access preamble on a random access channel occasion (random access channel (RACH) occasion, RO). If the paging list does not include the identifier of the terminal device, the terminal device may continue to sleep, so that power consumption is reduced.

In a possible implementation, the network device may send one or more synchronization signal blocks (SSBs) to the terminal device, where there is a correspondence between an SSB and an RO. The terminal device may measure the SSBs, to determine an SSB that meets a condition. The SSB that meets the condition may be an SSB whose received signal strength is highest, an SSB whose received signal strength is greater than or equal to a first threshold, an SSB whose received signal power is highest, an SSB whose received signal power is greater than or equal to a second threshold, an SSB whose received signal quality is highest, an SSB whose received signal quality is greater than or equal to a third threshold, or the like. This is not limited. Further, the terminal device may determine, based on the correspondence between an SSB and an RO, an RO corresponding to the SSB that meets the condition. The terminal device sends the random access preamble on the RO corresponding to the SSB that meets the condition. It should be noted that one SSB may include a primary synchronization signal (PSS), a secondary synchronization signal (SSS), and a physical broadcast channel (PBCH). The PSS and the SSS may be used by the terminal device for synchronization, and the PBCH may be used to carry a master information block (MIB) and the like.

Figure 3:
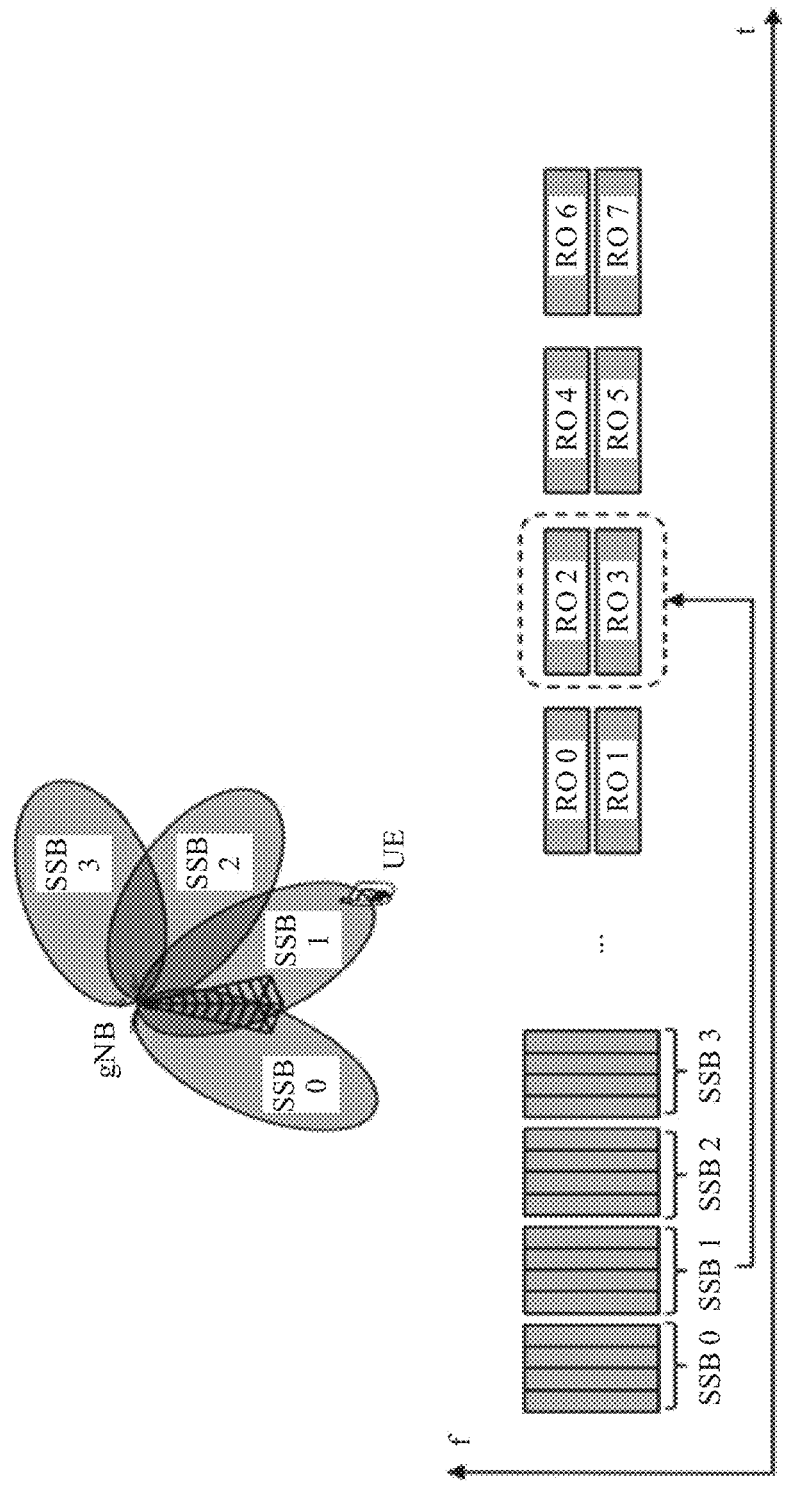
FIG. 3 is a schematic diagram of determining an RO based on an SSB according to an embodiment of this application.

For example, FIG. 3 is a schematic diagram of sending a random access preamble. In the schematic diagram, a horizontal axis represents time, and a vertical axis represents frequency. In the schematic diagram, four SSBs which are respectively an SSB 0, an SSB 1, an SSB 2, and an SSB 3 are included. The four SSBs are time division multiplexed, that is, occupy a same frequency domain resource but different time-frequency resources. In the schematic diagram, eight ROs which are respectively an RO 0 to an RO 7 are further included. The eight ROs may be time division multiplexed and frequency division multiplexed. Specifically, the eight ROs may be divided into four groups. The RO 0 and the RO 1 belong to the first group; the RO 2 and the RO 3 belong to the second group; the RO 4 and the RO 5 belong to the third group; and the RO 6 and the RO 7 belong to the fourth group. Different RO groups may be time division multiplexed, that is, occupy a same frequency domain resource but different time domain resources. ROs included in an RO group may be frequency division multiplexed, that is, occupy a same time domain resource but different frequency domain resources. The first group is used as an example. The RO 0 and the RO 1 may be frequency division multiplexed, and occupy a same time domain resource but different frequency domain resources. Further, there may be a correspondence between the four SSBs and the eight ROs. For example, there may be a correspondence between the SSB 0 and the RO 0 and the RO 1. Alternatively, in other words, there may be a correspondence between the SSB 0 and the first group of ROs. There may be a correspondence between the SSB 1 and the RO 2 and the RO 3. Alternatively, in other words, there may be a correspondence between the SSB 1 and the second group of ROs. There may be a correspondence between the SSB 2 and the RO 4 and the RO 5. Alternatively, in other words, there may be a correspondence between the SSB 2 and the third group of ROs. There may be a correspondence between the SSB 3 and the RO 6 and the RO 7. Alternatively, in other words, there may be a correspondence between the SSB 3 and the fourth group of ROs.

In a possible implementation, the network device may send the four SSBs, and the four SSBs have different beam directions. Because the terminal device is located in a beam direction corresponding to the SSB 1, energy for receiving the SSB 1 by the terminal device is probably higher than that of the other three SSBs. Therefore, the terminal device may select an RO corresponding to the SSB 1 to perform random access, that is, select the RO corresponding to the SSB 1 to send the random access preamble. It can be learned from the foregoing descriptions that ROs corresponding to the SSB 1 are the RO 2 and the RO 3, and the terminal device may randomly select an RO from the RO 2 and the RO 3, to send the random access preamble. It should be noted that, in the schematic diagram shown in FIG. 3, an example in which the network device is a gNB and the terminal device is UE is specifically used for description.

It is assumed that the network device respectively sends the SSB 0 to the SSB 3 by sequentially using a downlink beam 0 to a downlink beam 3. Specifically, the terminal device is located in a direction of the downlink beam 1 corresponding to the SSB 1. In a possible manner, the terminal device may adjust and/or optimize a reception beam, so that quality of receiving the SSB 1 by the terminal device is optimal. Then, the terminal device may use the adjusted and/or optimized reception beam as a transmission beam, and send the random access preamble by using the transmission beam. The network device may use, as a reception beam, the downlink beam 1 corresponding to the SSB 1, to receive the random access preamble. This improves quality of receiving the random access preamble.

It can be learned from the foregoing example that the network device uses, as a reception beam, a downlink beam used to send an SSB, to receive the random access preamble sent by the terminal device. A beam of the SSB is usually a wide beam in a fixed direction, resulting in disadvantages such as poor flexibility and a low beam gain. Therefore, when the network device receives the random access preamble by using the beam of the SSB, there are also disadvantages such as poor flexibility and a low beam gain.

Based on the foregoing descriptions, embodiments of this application provide a communication method and apparatus. A principle of the method is as follows: A correspondence between a wake-up signal (WUS) and an RO is set. A terminal device receives a WUS, and then may determine, based on the correspondence between a WUS and an RO, an RO on which a random access preamble is sent. In addition, according to a beam reciprocity principle, a network device uses, as a reception beam, a downlink beam used to send the WUS, to receive the random access preamble. Compared with a beam of an SSB, a beam of the WUS is narrower and more flexible, and has a higher beam gain. Therefore, when the network device receives the random access preamble by using the beam of the WUS, there are also advantages such as high flexibility and a high beam gain.

For ease of understanding, communication nouns or terms used in embodiments of this application are explained and described. The communication nouns or terms are also used as a part of content of this application.

1. Terminal Device

The terminal device may be referred to as a terminal for short, and is a device having a wireless transceiver function. The terminal device may be deployed on land, including being deployed indoor or outdoor or being handheld or vehicle-mounted; may be deployed on water (for example, on a ship); or may be deployed in the air (for example, on a plane, a balloon, or a satellite). The terminal device may be a mobile phone, a tablet computer (pad), a computer having a wireless transceiver function, a virtual reality (VR) terminal device, an augmented reality (AR) terminal device, a wireless terminal device in industrial control, a wireless terminal device in self-driving, a wireless terminal device in telemedicine (remote medical), a wireless terminal device in a smart grid, a wireless terminal device in transportation safety, a wireless terminal device in a smart city, or a wireless terminal device in a smart home, and may further include user equipment (UE) and the like. Alternatively, the terminal device may be a cellular phone, a cordless phone, a session initiation protocol (SIP) phone, a wireless local loop (WLL) station, a personal digital assistant (PDA), a handheld device having a wireless communication function, a computing device or another processing device connected to a wireless modem, a vehicle-mounted device, a wearable device, a terminal device in a future 5th generation (5G) network, a terminal device in a future evolved public land mobile network (PLMN), or the like. The terminal device sometimes may also be referred to as user equipment (UE), an access terminal device, a vehicle-mounted terminal device, an industrial control terminal device, a UE unit, a UE station, a mobile station, a remote station, a remote terminal device, a mobile device, a UE terminal device, a wireless communication device, a UE agent, a UE apparatus, or the like. The terminal device may be fixed or mobile. This is not limited in embodiments of this application.

By way of example but not limitation, in this application, the terminal device may be a wearable device. The wearable device may also be referred to as a wearable intelligent device, and is a general term of wearable devices, such as glasses, gloves, watches, clothes, and shoes, that are developed by applying wearable technologies in intelligent designs of daily wear. The wearable device is a portable device that can be directly worn on a body or integrated into clothes or an accessory of a user. The wearable device is not only a hardware device, but is used to implement powerful functions through software support, data exchange, and cloud interaction. Generalized wearable intelligent devices include full-featured and large-size devices that can implement complete or partial functions without depending on smartphones, for example, smart watches or smart glasses, and devices that focus on only one type of application function and need to work with another device such as a smartphone, for example, various smart bands or smart accessories for monitoring physical signs.

In this application, the terminal device may be a terminal in an internet of things (IoT) system. IoT is an important component in development of future information technologies. A main technical feature of the IoT is to connect an object to a network by using a communication technology, to implement an intelligent network of human-machine interconnection and thing-thing interconnection. The terminal device in this application may be a terminal device in machine type communication (MTC). The terminal device in this application may be a vehicle-mounted module, a vehicle-mounted component, a vehicle-mounted chip, or a vehicle-mounted unit that is built in a vehicle as one or more components or units. The vehicle uses the vehicle-mounted module, the vehicle-mounted component, the vehicle-mounted chip, or the vehicle-mounted unit that is built in the vehicle, to implement a method in this application. Therefore, embodiments of this application may be applied to the internet of vehicles, for example, vehicle to everything (V2X), long term evolution-vehicle (LTE-V), or vehicle-to-vehicle (V2V).

In embodiments of this application, an apparatus configured to implement a function of the terminal may be a terminal, or may be an apparatus, for example, a chip system or a processor, that can support the terminal in implementing the function. The apparatus may be disposed in the terminal. In embodiments of this application, the chip system may include a chip, or may include a chip and another discrete component. Technical solutions provided in embodiments of this application are described by using an example in which the apparatus configured to implement the function of the terminal is a terminal and the terminal is UE.

2. Network Device

The network device may be an access network device. The access network device may also be referred to as a radio access network (RAN) device, and is a device that provides a wireless communication function for the terminal device. For example, the access network device includes but is not limited to: a next-generation base station (generation NodeB, gNB) in 5G, an evolved NodeB (eNB), a radio network controller (RNC), a NodeB (NB), a base station controller (BSC), a base transceiver station (BTS), a home base station (for example, a home evolved NodeB or a home NodeB, HNB), a baseband unit (BBU), a transmission reception point (transmitting and receiving point, TRP), a transmission point (TP), a mobile switching center, and the like. Alternatively, the access network device may be a radio controller, a centralized unit (CU), and/or a distributed unit (DU) in a cloud radio access network (CRAN) scenario, or the network device may be a relay station, an access point, a vehicle-mounted device, a terminal device, a wearable device, a network device in a future 5G network, a network device in a future evolved PLMN, or the like. The terminal device may communicate with a plurality of access network devices that use different technologies. For example, the terminal device may communicate with an access network device that supports long term evolution (LTE), or may communicate with an access network device that supports 5G, or may implement dual connectivity to an access network device that supports LTE and an access network device that supports 5G. This is not limited in embodiments of this application.

In embodiments of this application, an apparatus configured to implement a function of the network device may be a network device, or may be an apparatus, for example, a chip system or a processor, that can support the network device in implementing the function. The apparatus may be disposed in the network device. The technical solutions provided in embodiments of this application are described by using an example in which the apparatus configured to implement the function of the network device is a network device and the network device is a base station.

3. Wake-Up Signal (WUS)

The WUS may be a signal having a wake-up function, for example, a channel state information-reference signal (CSI-RS), a synchronization signal, a synchronization signal block (SSB), a demodulation reference signal (DMRS), or another newly designed signal. This is not limited.

The WUS is used to indicate the terminal device to receive, monitor, detect, or listen to (detect), on one or more paging occasions (POs), DCI for scheduling a paging message, namely, paging DCI. Alternatively, in other words, the WUS is used to indicate to monitor, on one or more POs, DCI used for paging. Alternatively, in other words, the WUS is used to indicate whether to monitor, on one or more POs, DCI used for paging. When the terminal device receives the WUS, it may be considered that the terminal is woken up by the WUS. The wake-up signal may also be referred to as an awakening signal, an activation signal, or the like.

For example, in a new radio (NR) system, a network device may send a paging message to a terminal device that is in idle mode, sleeping mode, or inactive mode. DCI for scheduling the paging message, namely, paging DCI, may be sent on a PO. The PO may be determined based on a paging search space and a corresponding control resource set. The paging search space is used to indicate a monitoring occasion of a PDCCH that carries the downlink control information. The PDCCH monitoring occasion may be periodic or aperiodic. This is not limited. The corresponding control resource set may be used to indicate a time-frequency resource of the PDCCH on the PDCCH monitoring occasion. One PO may include one or more PDCCH monitoring occasions. The plurality of PDCCH monitoring occasions may be consecutive or inconsecutive in time domain. This is not limited. The terminal device may determine a location of the PO based on an identifier of the terminal device (for example, a UE ID or a UE radio network temporary identifier (RNTI)), and receive, detect, monitor, or listen to the paging DCI on the PO. The terminal may receive the paging message and the like based on the paging DCI. It should be noted that, in the following embodiments, receiving, detection, monitoring, and listening are not distinguished from each other, and may be replaced with each other. For example, receiving may be replaced with detection, monitoring, or listening. In a specific example, that the terminal device receives the WUS or the paging message may be replaced with that the terminal device detects the WUS or the paging message, or may be replaced with that the terminal device monitors the WUS or the paging message, or may be replaced with that the terminal device listens to the WUS or the paging message.

The WUS may be generated based on a sequence (for example, an m-sequence, a Gold sequence, or a ZC (Zadoff-Chu) sequence). The terminal device may detect the foregoing sequence signal by performing a simple cross-correlation operation, so that the detection is simple, and power consumption overheads are low.

The WUS may usually indicate wake-up in the following two manners.

Figure 4:
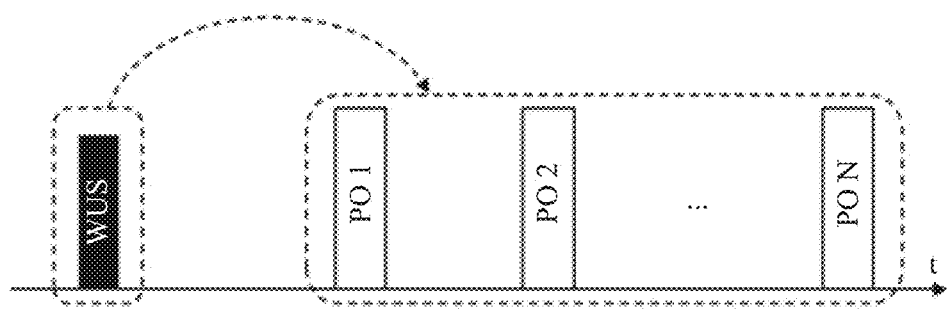
FIG. 4 is a schematic diagram of monitoring a PO based on a WUS according to an embodiment of this application.
Figure 4:
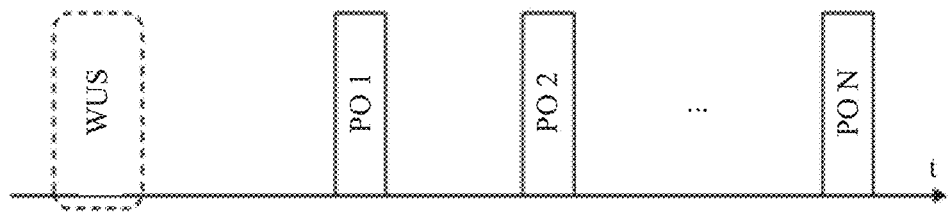

In one manner, whether there is a WUS is used to indicate whether to wake the terminal device up. For example, the network device may indicate, by sending the WUS, to wake the terminal device up. Correspondingly, the terminal device wakes up when receiving the WUS. Alternatively, the network device may indicate, by not sending the WUS, not to wake the terminal device up. Correspondingly, the terminal device may continue to sleep or perform another operation when not receiving the WUS. For example, the terminal device may first determine whether the WUS is detected. If the terminal device detects the WUS, the terminal device receives, detects, monitors, or listens to, on one or more subsequent POs, DCI for scheduling a paging message, namely, paging DCI. The terminal may receive the paging message based on scheduling of the paging DCI. If the terminal device does not detect the WUS, the terminal device may continue to sleep and does not need to perform blind detection on one or more subsequent POs, to reduce power consumption. For example, as shown in FIG. 4, if the terminal device detects the WUS, the terminal device may listen to the paging DCI on N subsequent POs, and receive the paging message based on scheduling of the paging DCI; or if the terminal device does not detect the WUS, the terminal device does not need to listen to the paging DCI and continues to sleep on N subsequent POs.

In the other manner, different WUSs indicate whether to wake the terminal device up. For example, a first WUS may indicate to wake the terminal device up, and a second WUS may indicate not to wake the terminal device up. The network device may indicate, by sending the first WUS, to wake the terminal device up. Correspondingly, the terminal device wakes up when receiving the first WUS. The network device may indicate, by sending the second WUS, not to wake the terminal device up. Correspondingly, the terminal device continues to sleep when receiving the second WUS. The first WUS and the second WUS may be distinguished from each other by using a sequence or a time-frequency transmission resource, or may be distinguished from each other in another distinguishing manner or the like. This is not limited in the present application provided that the terminal device can distinguish between the first WUS and the second WUS that are sent by the network device.

In an example, the WUS may occupy one or two physical resource blocks (PRBs) in frequency domain, and may occupy M consecutive subframes or slots in time domain. A value of M may be predefined, or may be configured by the network device for the terminal (for example, configured by using radio resource control (RRC) signaling).

4. Random Access Channel Occasion (Random Access Channel (RACH) Occasion, RO)

The RO includes a time domain resource and a frequency domain resource. The terminal device may send a random access preamble on the RO, to initiate random access. The RO may be predefined, or may be configured by the network device for the terminal. For example, the RO may be configured for the terminal device by using RRC signaling (for example, a system message or an RRC dedicated message). There is a correspondence between an SSB and an RO. The correspondence may be specifically as follows: One SSB corresponds to one RO; one SSB corresponds to a plurality of ROs; a plurality of SSBs correspond to one RO; and so on. The correspondence between an SSB and an RO may be predefined, or may be configured by the network device for the terminal. For example, the correspondence between an SSB and an RO may be configured for the terminal device by using RRC signaling (for example, a system message or an RRC dedicated message).

In a possible implementation, the network device may send random access configuration information, where the random access configuration information may include information required for determining a time-frequency resource of one or more ROs and information used to configure the correspondence between an RO and an SSB. The terminal device may measure the SSBs, to select an SSB that meets a condition, and send the random access preamble on an RO corresponding to the SSB. The SSB that meets the condition may be specifically an SSB whose received signal energy is the highest, an SSB whose received signal energy is greater than or equal to a threshold, or the like. This is not limited. It may be understood that, if the SSB that meets the condition corresponds to a plurality of ROs, an RO may be randomly selected from the plurality of ROs to send the random access preamble and the like.

5. Quasi Co-Location (QCL)

QCL may indicate a relationship between two ports or a relationship between two signals. QCL between two signals from two ports indicates that the signals from the two ports have same attributes. These attributes include one or more of the following: an average gain, a spatial Rx parameter, a Doppler frequency shift, delay spread, and the like. In NR, QCL is classified into four types: QCL-A, QCL-B, QCL-C, and QCL-D. QCL-A indicates that ports or signals have a same Doppler frequency shift, same Doppler spread, a same average delay, and same delay spread. QCL-B indicates that ports or signals have a same Doppler frequency shift and a same Doppler spread parameter. QCL-C indicates that ports or signals have a same Doppler frequency shift and a same average delay parameter. QCL-D indicates that ports or signals have a same spatial Rx parameter.

If two signals are QCL, it may be equivalent to that the two signals are transmitted through a same port, or it is equivalent to that beams of the two signals are associated. For example, if a WUS and an SSB are QCL, it may be equivalent to that the WUS and the SSB are transmitted through a same port, or it is equivalent to that a beam of the WUS is associated with a beam of the SSB.

6. Beam

The beam may be understood as a spatial domain filter, a spatial filter, a spatial parameter, or the like. A beam used to send a signal may be understood as a transmission beam (Tx beam), a spatial domain transmission filter, a spatial transmission parameter, or the like. A beam used to receive a signal may be understood as a reception beam (Rx beam), a spatial domain receive filter (, a spatial Rx parameter, or the like.

The transmission beam may be understood as distribution of signal strength formed in different directions in space after a signal is transmitted through an antenna, and the reception beam may be understood as distribution of signal strength, in different directions in space, of a radio signal received from an antenna.

In addition, the beam may be a wide beam, a narrow beam, a beam of another type, or the like. A technology for forming the beam may be a beamforming technology or another technology. This is not limited. For example, the beamforming technology may be specifically a digital beamforming technology, an analog beamforming technology, or a hybrid digital/analog beamforming technology.

Optionally, a plurality of beams having a same communication feature or similar communication features may be considered as one beam. One beam may include one or more antenna ports, configured to transmit one or more of a data channel, a control channel, or a reference signal. The one or more antenna ports forming the beam may also be considered as one antenna port set.

The beam may correspond to a resource. For example, during beam measurement, the network device measures different beams by using different resources, and the terminal device feeds back measured resource quality, so that the network device can determine quality of corresponding beams. During beam measurement, one beam of the network device corresponds to one resource. Therefore, a beam corresponding to a resource may be identified by using an index of the resource. Alternatively, a beam may correspond to a reference signal, a synchronization signal, or a synchronization signal block SSB. For example, the network device sends different SSBs, for example, SSBs having different indexes, in different beam directions, and the terminal device measures and reports the SSBs. Results of measuring the SSBs by the terminal device may reflect quality of different beams sent by the network device to the terminal device.

7. Beam Reciprocity

According to channel reciprocity of radio signal propagation, the terminal device adjusts and/or optimizes a reception beam based on a downlink beam, and then uses the optimized and/or adjusted reception beam as a transmission beam to send an uplink signal. In this case, the network device may use the downlink beam as a reception beam to receive the uplink signal. This improves quality of receiving the uplink signal.

The foregoing process is described by using an SSB and a random access preamble as an example. The network device sends the SSB by using a downlink beam. The terminal device adjusts and optimizes the beam used to receive the SSB, so that quality of receiving the SSB is optimal. Then, the terminal device uses the adjusted and optimized reception beam as a transmission beam, and sends the random access preamble by using the transmission beam. Correspondingly, the network device uses, as a reception beam, the downlink beam used to send the SSB, and receives the random access preamble by using the reception beam, so that quality of receiving the random access preamble by the terminal device can be improved.

It may be understood that a beam used to send a downlink signal may be referred to as a downlink beam, and a beam used to send an uplink signal may be referred to as an uplink beam. From a perspective of a terminal device side, a transmission beam may be the uplink beam, and a reception beam may be the downlink beam. Alternatively, this may be described as follows: A reception beam is a beam used to receive the downlink signal. From a perspective of a network device side, a transmission beam is the downlink beam, and a reception beam is the uplink beam. Alternatively, this may be described as follows: A reception beam is a beam used to receive the uplink signal. Unless otherwise specified, in descriptions of embodiments of this application, a transmission beam and a transmit beam are not distinguished from each other, and may be replaced with each other.

8. Combination of Time Division Multiplexing and Frequency Division Multiplexing The combination of time division multiplexing and frequency division multiplexing may also be referred to as time division multiplexing and frequency division multiplexing. The combination of time division multiplexing and frequency division multiplexing may mean that a same time domain resource is occupied and/or a same frequency domain resource is occupied. It should be noted that an object of the combination of time division multiplexing and frequency division multiplexing may be a signal, information, an occasion, a sequence, a preamble, or the like. This is not limited. FIG. 3 is used as an example. Eight ROs: an RO 0 to an RO 7 may be time division multiplexed and frequency division multiplexed. The eight ROs in FIG. 3 may occupy a same time domain resource, and/or occupy a same frequency domain resource. For example, the RO 0 and the RO 1 may occupy a same time domain resource but different frequency domain resources. The RO 0 and the RO 2 may occupy a same frequency domain resource but different time domain resources. For example, the eight ROs may be divided into four groups. The RO 0 and the RO 1 belong to the first group; the RO 2 and the RO 3 belong to the second group; the RO 4 and the RO 5 belong to the third group; and the RO 6 and the RO 7 belong to the fourth group. Different RO groups may be time division multiplexed, that is, occupy a same frequency domain resource but different time domain resources. ROs included in an RO group may be frequency division multiplexed, that is, occupy a same time domain resource but different frequency domain resources. The first group is used as an example. The RO 0 and the RO 1 may be frequency division multiplexed, and occupy a same time domain resource but different frequency domain resources.

Figure 5:
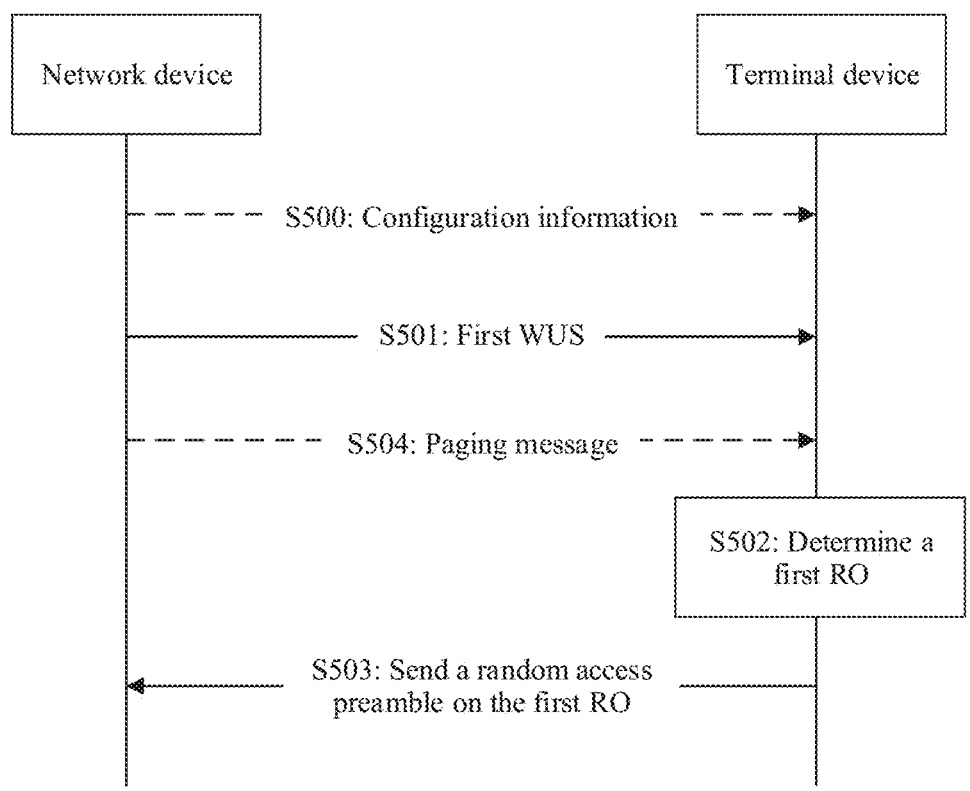
FIG. 5 is a schematic flowchart of a communication method according to an embodiment of this application.

As shown in FIG. 5, a communication method is provided. The method is executed by a terminal device and a network device. The terminal device may be the terminal device 120 in FIG. 1, and the network device may be the network device 110 in FIG. 1. Alternatively, the terminal device may be at least one of the terminal device 201 to the terminal device 206 in FIG. 2, and the network device may be the network device 207 in FIG. 2. It may be understood that the terminal device in the method may alternatively be a component (for example, a processor, a chip, or a chip system) of the terminal device, and the network device in the method may alternatively be a component (for example, a processor, a chip, or a chip system) of the network device. The procedure includes the following steps.

S501: The network device sends a first WUS. Correspondingly, the terminal device receives the first WUS.

The first WUS may be one of K WUSs, and K is an integer greater than or equal to 1. For example, in a specific implementation, K may be an integer greater than or equal to 2. In this embodiment of this application, the terminal device may determine the first WUS based on a condition such as received signal power, received signal strength, or received signal quality of the WUSs.

For example, in an implementation, the terminal device may determine the first WUS based on the received signal power. The terminal device may measure the received signal power of the K WUSs, and determine, as the first WUS, a WUS whose received signal power is the highest. In this case, the first WUS is the WUS whose received signal power is the highest in the K WUSs. Alternatively, the terminal device may determine, as the first WUS, a WUS whose received signal power is greater than or equal to a first threshold in the received signal power of the K WUSs. If there are a plurality of WUSs whose received signal power is greater than or equal to the first threshold, the terminal device may randomly select a WUS from the plurality of WUSs as the first WUS, or may determine, as the first WUS, a WUS whose received signal power is the highest in the plurality of WUSs. If there is one WUS whose received signal power is greater than or equal to the first threshold, the WUS is the first WUS. In this case, the first WUS is the WUS whose received signal power is greater than or equal to the first threshold in the K WUSs.

In another implementation, the terminal device may determine the first WUS based on the received signal strength. The terminal device may measure the received signal strength of the K WUSs, and determine, as the first WUS, a WUS whose received signal strength is the highest. In this case, the first WUS is the WUS whose received signal strength is the highest in the K WUSs. Alternatively, the terminal device may determine a WUS whose received signal strength is greater than or equal to a second threshold in the received signal strength of the K WUSs. If there are a plurality of WUSs whose received signal strength is greater than or equal to the second threshold, the terminal device may randomly select a WUS from the plurality of WUSs as the first WUS, or may determine, as the first WUS, a WUS whose received signal strength is the highest in the plurality of WUSs. If there is one WUS whose received signal strength is greater than or equal to the second threshold, the WUS is the first WUS. In this case, the first WUS is the WUS whose received signal strength is greater than or equal to the second threshold in the K WUSs.

In still another implementation, the terminal device may determine the first WUS based on the received signal quality. The terminal device may measure the received signal quality of the K WUSs, and determine, as the first WUS, a WUS whose received signal quality is the highest. In this case, the first WUS is the WUS whose received signal quality is the highest in the K WUSs. Alternatively, the terminal device may determine a WUS whose received signal quality is greater than or equal to a third threshold in the received signal quality of the K WUSs. If there are a plurality of WUSs whose received signal quality is greater than or equal to the third threshold, the terminal device may randomly select a WUS from the plurality of WUSs as the first WUS, or may determine, as the first WUS, a WUS whose received signal quality is the highest in the plurality of WUSs. If there is one WUS whose received signal quality is greater than or equal to the third threshold, the WUS is the first WUS. In this case, the first WUS is the WUS whose received signal quality is greater than or equal to the third threshold in the K WUSs.

It should be noted that the first threshold, the second threshold, and the third threshold may be predefined, or may be configured by the network device for the terminal device. This is not limited. The "greater than or equal to" may be replaced with "greater than" or the like.

For example, in S501, frequency division multiplexing may be used between the K WUSs. To be specific, the K WUSs occupy a same time domain resource but different frequency domain resources, and the different frequency domain resources occupied by the WUSs may have a same size or different sizes. An advantage of sending the K WUSs by using frequency division multiplexing is as follows: The terminal device needs to detect only WUSs in a narrow bandwidth. This helps reduce detection complexity.

Alternatively, time division multiplexing may be used between the K WUSs. To be specific, the K WUSs occupy a same frequency domain resource but different time domain resources, and the different time domain resources occupied by the WUSs may have a same size or different sizes. An advantage of sending the K WUSs by using time division multiplexing is as follows: The terminal device can receive and detect different WUSs in some bandwidth. In this way, the terminal device performs beam training or channel measurement based on the WUSs.

Alternatively, a combination of time division multiplexing and frequency division multiplexing may be used between the K WUSs. To be specific, the K WUSs occupy different time domain resources and different frequency domain resources, the different time domain resources occupied by the WUSs may have a same size or different sizes, and the different frequency domain resources occupied by the WUSs may have a same size or different sizes. An advantage of sending the K WUSs by using the combination of time division multiplexing and frequency division multiplexing is as follows: The terminal device may select one WUS to perform narrowband receiving. However, when the terminal device needs to receive optimal WUSs from different locations at different time points, the terminal device may receive and detect the WUSs in a broadband manner, to perform beam training or channel measurement within a range of the broadband. In this way, the terminal device can select, based on a requirement of the terminal device, an appropriate manner of receiving the WUSs. This improves flexibility of WUS detection.

In a possible implementation, one of the K WUSs may occupy X time units in time domain, where a unit of the time unit may be a symbol, a slot, or the like; and may occupy Y frequency domain units in frequency domain, where a unit of the frequency domain unit may be a subcarrier, a resource block (RB), or the like. X and Y are integers greater than or equal to 1. The time units occupied by the WUS may be consecutive or inconsecutive in time domain. The frequency domain units occupied by the WUS may be consecutive or inconsecutive in frequency domain.

For example, a time domain resource occupied by a WUS may be directly proportional to a subcarrier spacing. For example, if a subcarrier spacing of a WUS is $15 \cdot 2^u$ kHz, where u=0, 1, 2, . . . , a time domain resource occupied by the WUS may include $L \cdot 2^u$ time units, where L is an integer greater than or equal to 1. For example, when a subcarrier spacing of a WUS is 15 kHz, a time domain resource occupied by the WUS may include L time units. When a subcarrier spacing of a WUS is 30 kHz, a time domain resource occupied by the WUS may include 2*L time units. An advantage of such a design is as follows: Absolute time lengths of the WUSs are the same regardless of values of subcarrier spacings. In this way, when there is a difference between timing of the terminal device and timing of the network device, synchronization timing can be performed by using the WUSs having the absolute time length, and there is no need to design different timing capability requirements for the WUSs having different subcarrier spacings. Therefore, the terminal device may not need to adjust a radio signal receiving time point based on the different subcarrier spacings of the WUSs. This simplifies implementation of the terminal device.

For example, in S501, the K WUSs may be generated based on different sequences. For example, the K WUSs may be generated based on K sequences. For example, the network device may generate the K sequences. The sequences may be m-sequences, Gold sequences, ZC sequences, or the like. Initial phases, initial values, or root sequences of the K sequences are different from each other. The K WUSs may be generated based on the K sequences.

Alternatively, the K WUSs may be generated based on a same sequence. For example, the network device may generate one sequence. The sequence may be an m-sequence, a Gold sequence, a ZC sequence, or the like. Then, different beam weighting is performed on K parts of the sequence to obtain the K WUSs. Alternatively, in other words, the K WUSs are generated based on K parts of a same WUS. For example, the network device may perform different precoding on the K parts of the WUS to obtain the K WUSs.

Optionally, in this embodiment of this application, after the terminal device receives the first WUS in S501, the method may further include the following steps.

S504: The network device sends a paging message. Correspondingly, the terminal device receives the paging message.

The network device pages the terminal device. After receiving the paging message and finding that the terminal device is paged, the terminal device may initiate random access, to perform the following steps S502 and S503.

For example, the terminal device may receive the paging message in the following manner. For example, the network device indicates, depending on whether there is a WUS, whether the terminal device is to monitor the paging message. In this case, after receiving the first WUS, the terminal device may determine a paging occasion (PO), and monitor, on the determined PO, DCI for scheduling the paging message, namely, paging DCI. In an example, because one PO includes one or more PDCCH monitoring occasions, that the terminal device monitors the paging DCI on the PO may be described as follows: The terminal device detects the paging DCI on the one or more PDCCH monitoring occasions included in the PO. The terminal device may receive, based on scheduling of the paging DCI, a PDSCH that carries the paging message. If the terminal device obtains, through monitoring, the paging message for paging the terminal device, the terminal device determines that the terminal device is paged, and initiates a random access procedure, that is, performs processes in the following S502 and S503. If the terminal device does not obtain, through monitoring, the paging message for paging the terminal device, the terminal device continues to sleep, to reduce power consumption. In this case, the first WUS may be described as being used to indicate the terminal device to monitor the paging DCI on the PO. Alternatively, the network device may use different WUSs to indicate whether the terminal device is to monitor the paging DCI on the PO. For example, the network device may use a WUS 1 to indicate the terminal device to monitor the paging DCI on the PO, and use a WUS 2 to indicate the terminal device not to monitor the paging DCI on the PO. After the terminal device receives the first WUS, if the first WUS is the WUS 1, the terminal device may monitor the paging DCI on the PO, and receive the paging message based on scheduling of the paging DCI. If the terminal device finds that a paging list included in the paging message includes an identifier of the terminal device, the terminal device determines that the terminal device is paged, and initiates the random access procedure, that is, performs processes in the following S502 and S503. If the terminal device does not obtain, through monitoring, the paging DCI on the PO, or if a paging list included in the paging message received based on scheduling of the paging DCI does not include an identifier of the terminal device, the terminal device continues to sleep. If the first WUS received by the terminal device is the WUS 2, the terminal device may continue to sleep. In this case, the first WUS may be described as indicating whether the terminal device is to monitor the paging DCI on the PO.

It should be noted that the WUS 1 and the WUS 2 may be distinguished from each other by using a sequence or a time-frequency transmission resource, or may be distinguished from each other in another manner or the like. This is not limited. This falls within the protection scope of this embodiment of this application provided that the terminal device can distinguish between the WUS 1 and the WUS 2 that are sent by the network device.

S502: The terminal device determines a first RO, where the first RO is one of N ROs, N is an integer greater than or equal to 1, and there is a correspondence between the first WUS and the N ROs.

In a possible implementation, the terminal device may determine the first RO based on the first WUS, where there is a correspondence between the first WUS and the N ROs. Alternatively, the terminal device may determine, based on the first WUS, one of the N ROs as the first RO, where there is a correspondence between the first WUS and the N ROs. For example, when N is an integer greater than 1, there is a correspondence between the first WUS and a plurality of ROs. The terminal device may randomly select an RO from the plurality of ROs as the first RO. When N is equal to 1, there is a correspondence between the first WUS and one RO. The terminal device may determine that the RO is the first RO. It may be understood that the correspondence between the first WUS and the N ROs may be predefined, or may be configured by the network device for the terminal device. For example, the network device may configure the correspondence for the terminal device by using radio resource control (RRC) signaling.

Optionally, a frequency domain resource occupied by a WUS may be the same as a frequency domain resource occupied by an RO that has a correspondence with the WUS. For example, if there is a correspondence between the first WUS and the N ROs, a frequency domain resource occupied by the first WUS may be the same as frequency domain resources occupied by the N ROs.

For example, the correspondence between the first WUS and the N ROs may be a direct correspondence or an indirect correspondence. For example, the direct correspondence between the first WUS and the N ROs may be as follows: There is a correspondence between a time domain resource of the first WUS and the N ROs; there is a correspondence between a frequency domain resource of the first WUS and the N ROs; there is a correspondence between a code domain resource of the first WUS and the N ROs; there is a correspondence between a spatial domain resource of the first WUS and the N ROs; there is a correspondence between an identifier of the first WUS and the N ROs; or there is a correspondence between a sequence of the first WUS and the N ROs. The indirect correspondence between the first WUS and the N ROs may be as follows: The first WUS is quasi-co-located with a first SSB, and there is a correspondence between the first SSB and the N ROs; the first WUS is quasi-co-located with a first CSI-RS, and there is a correspondence between the first CSI-RS and the N ROs; or the first WUS is quasi-co-located with a first DMRS, and there is a correspondence between the first DMRS and the N ROs.

In a possible implementation, the WUS in this embodiment of this application may be a reference signal, for example, a CSI-RS, that has a function of indicating whether the terminal device is to detect the paging DCI. In other words, the WUS in this embodiment of this application may be specifically a CSI-RS, and the CSI-RS has a function of indicating whether the terminal device is to detect the paging DCI. Alternatively, the WUS in this embodiment of this application may be a reference signal, for example, a CSI-RS, that has a function of indicating the terminal device to detect the paging DCI. In other words, the WUS in this embodiment of this application may be specifically a CSI-RS, and the CSI-RS has a function of indicating the terminal device to detect the paging DCI. In this case, in this embodiment of this application, a CSI-RS configuration manner may be used for configuration information, for example, a time-frequency resource and a generation sequence, of a WUS, and a CSI-RS sending and detection method may also be used for a WUS sending and detection method. This reduces implementation complexity of the network device and the terminal device.

Regardless of whether the correspondence between the first WUS and the N ROs is the direct correspondence or the indirect correspondence, the correspondence may be pre-defined, or may be configured by the network device for the terminal device. This is not limited.

Optionally, the correspondence between the first WUS and the N ROs is configured by the network device. In this case, the procedure shown in FIG. 5 may further include the following step. S500: The network device sends configuration information to the terminal device, where the configuration information is used to configure a correspondence between a WUS and an RO. The configuration information may be sent in a manner such as broadcast, multicast, or unicast. This is not limited. A specific configuration manner may include the following two solutions.

A first solution may be referred to as a solution of a direct correspondence between a WUS and an RO.

Solution 1.1: The network device may send the configuration information to the terminal device, where the configuration information may be used to configure a quantity of WUSs corresponding to one RO, and the like. The terminal device may determine the correspondence between an RO and a WUS based on the configuration information. For example, in an implementation, the terminal device may first obtain a WUS list and an RO list. The correspondence between a WUS and an RO may be determined based on the WUS list, the RO list, and the quantity that is configured based on the configuration information and that is of WUSs corresponding to one RO.

For example, refer to the following Table 1. The RO list configured by the network device for the terminal device includes four ROs whose indexes are sequentially an RO 0 to an RO 3, and the WUS list includes eight WUSs whose indexes are sequentially a WUS 0 to a WUS 7. In addition, the network device further configures, based on the configuration information, that a quantity of WUSs corresponding to each RO is 2, that is, each RO corresponds to two WUSs. In this case, the terminal device may determine, based on the configuration information, that the correspondence between an RO and a WUS is as follows: The RO 0 corresponds to {WUS 0, WUS 1}; the RO 1 corresponds to {WUS 2, WUS 3}; the RO 2 corresponds to {WUS 4, WUS 5}; and the RO 3 corresponds to {WUS 6, WUS 7}.

TABLE 1

| RO 0 | WUS 0 and WUS 1 |
| RO 1 | WUS 2 and WUS 3 |
| RO 2 | WUS 4 and WUS 5 |
| RO 3 | WUS 6 and WUS 7 |

Solution 1.2: The network device sends the configuration information to the terminal device, where the configuration information may be used to configure a WUS corresponding to each RO. The terminal device determines the correspondence between an RO and a WUS based on the configuration information. For example, the foregoing example is still used, and four ROs which are sequentially the RO 0 to the RO 3 are included. In this case, the network device indicates a WUS corresponding to each RO. Still as shown in Table 1, the network device indicates that WUSs corresponding to the RO 0 are a WUS 0 and a WUS 1, and indicates that WUSs corresponding to the RO 1 are a WUS 2 and a WUS 3. For the RO 2 and the RO 3, indication manners of the network device are similar to the foregoing descriptions. Details are not described again. It should be noted that, if one RO corresponds to a plurality of WUSs, the network device may indicate the plurality of WUSs corresponding to the RO or a WUS set corresponding to the RO.

Solution 1.3: The network device sends the configuration information to the terminal device, where the configuration information is used to configure an RO corresponding to each WUS. The terminal device may determine the correspondence between a WUS and an RO based on the configuration information. For example, as shown in Table 2, eight WUSs which are sequentially a WUS 0 to a WUS 7 are included. In this case, the network device indicates an RO corresponding to each of the eight WUSs. Specifically, the network device indicates that an RO corresponding to the WUS 0 is an RO 0, indicates that an RO corresponding to the WUS 1 is an RO 1, and indicates that an RO corresponding to the WUS 2 is an RO 2. Other indication processes of the WUS 3 to the WUS 7 are similar to the foregoing descriptions. Details are not described again.

TABLE 2

| WUS 0 | RO 0 |
| WUS 1 | RO 1 |
| WUS 2 | RO 2 |
| WUS 3 | RO 3 |
| WUS 4 | RO 4 |
| WUS 5 | RO 5 |
| WUS 6 | RO 6 |
| WUS 7 | RO 7 |

It should be noted that, in the foregoing solution 1.3, when one WUS corresponds to a plurality of ROs, the network device may indicate the plurality of ROs corresponding to the WUS, a RO set corresponding to the WUS, or the like. This is not limited.

In the first solution, a quasi co-location relationship between a WUS and another signal is not limited, and the another signal may be an SSB, a CSI-RS, a DMRS, or the like. For example, in a specific implementation, the WUS may not be quasi-co-located with any one of the SSB, the CSI-RS, or the DMRS, but has a specific beam direction. An advantage of this manner is as follows: A beam of the WUS is flexible, so that the network device can set a width and a direction of the beam of the WUS based on a requirement of the network device. This is not limited to a beam manner of the SSB, the CSI-RS, or the DMRS. Alternatively, in another specific implementation, the WUS may be quasi co-located with at least one of the SSB, the CSI-RS, or the DMRS. An advantage of this manner is as follows: The terminal device may optimize and/or adjust a reception beam of the WUS based on a measurement result of at least one of the SSB, the CSI-RS, or the DMRS, so that a probability of missed detection or false detection of the WUS is reduced.

A second solution may be referred to as a solution of an indirect correspondence between a WUS and an RO.

In this solution, the correspondence between a WUS and an RO may include a correspondence between the WUS and another signal and a correspondence between the another signal and the RO. The another signal may include one or more of signals such as an SSB, a CSI-RS, or a DMRS. Optionally, the correspondence between the WUS and the another signal may be a quasi co-location relationship. In the solution of the indirect correspondence, the correspondence between a WUS and an RO is established in a manner of "WUS-another signal-RO". An SSB is used as an example. There may be a quasi co-location relationship between a WUS and the SSB, and there may be a correspondence between the SSB and an RO. Therefore, there is also a correspondence between the WUS and the RO.

An advantage of the second solution is as follows: The correspondence between the another signal and the RO can be reused, so that better compatibility can be obtained. A manner in which there is a correspondence between the WUS and the another signal may be specifically a quasi co-location relationship between the WUS and the another signal. The quasi co-location relationship between the WUS and the another signal may be indicated by the network device to the terminal device, may be configured by the network device for the terminal device, or may be predefined. This is not limited.

Optionally, the configuration information in S500 is used to configure the correspondence between a WUS and an RO. In addition, the configuration information in S500 may further be used to configure the WUS and/or the RO. Alternatively, the network device may additionally send configuration information of the WUS to configure the WUS, and/or additionally send configuration information of the RO to configure the RO. This is not limited. Alternatively, the WUS and/or the RO are/is predefined.

The network device may send the configuration information of the WUS in a manner such as broadcast, unicast, or multicast. The configuration information of the WUS may indicate at least one of a time domain resource, a frequency domain resource, a code domain resource, or a spatial domain resource occupied by the WUS. Optionally, the network device may separately configure each WUS, or may simultaneously configure a plurality of WUSs. The plurality of WUSs may be in time division, frequency division, or code division mode. This is not limited. Alternatively, the time domain resource, the frequency domain resource, or the code domain resource occupied by the WUS is predefined.

The network device may send the configuration information of the RO in a manner such as broadcast, unicast, or multicast. The configuration information of the RO may be used to configure at least one of a time domain resource, a frequency domain resource, or a random access preamble set corresponding to the RO. For example, in a specific implementation, the network device may configure a physical random access channel (PRACH) configuration index. The terminal device may determine, based on the PRACH configuration index, the configuration information that is of the RO and that corresponds to the PRACH configuration index. The terminal device may determine, based on the determined configuration information of the RO, at least one of the time domain resource, the frequency domain resource, or the random access preamble set corresponding to the RO.

Optionally, the network device may additionally indicate one or more of a quantity of ROs that are frequency division multiplexed in frequency domain, a frequency domain position of the $1^{st}$ RO in frequency domain, an available random access preamble set, or the like. It should be noted that, in a periodicity, RO indexes may be sorted first in a frequency domain order and then in a time domain order.

S503: The terminal device sends a random access preamble on the first RO. Correspondingly, the network device receives the random access preamble on the first RO. It should be noted that, in this embodiment of this application, the random access preamble may also be referred to as a random access request, a preamble, a preamble carried on a physical random access channel (PRACH), a RACH preamble, a message 1 (Msg1), a message A (MsgA), or the like.

In a possible implementation, according to a beam reciprocity principle, in S501, the network device may send the first WUS by using a downlink beam. The terminal device may adjust and/or optimize a reception beam, so that quality of receiving the first WUS by the terminal device is optimal. Then, the terminal device may use the adjusted and/or optimized reception beam as a transmission beam. In S503, the terminal device may send the random access preamble by using the transmission beam. Correspondingly, the network device may use, as a reception beam, a downlink beam used to send the first WUS, to receive the random access preamble, so that quality of receiving the random access preamble is improved according to beam reciprocity. In addition, because the WUS may be sent by using a narrow beam, high flexibility is ensured, and a higher beam gain can be obtained. Therefore, the network device receives the random access preamble by using the beam corresponding to the WUS, so that flexibility and a beam gain of receiving the random access preamble can be improved.

Figure 6:
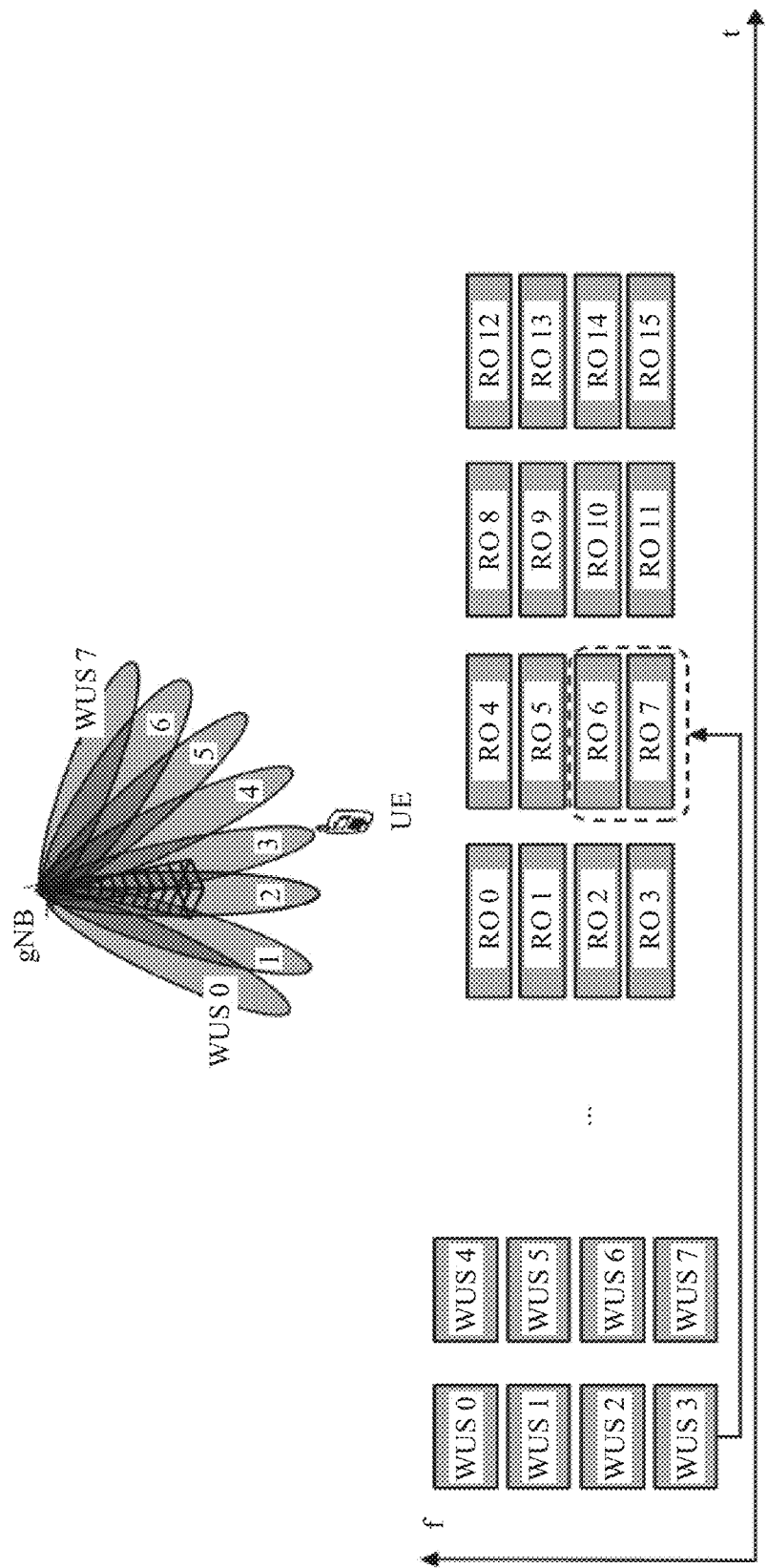
FIG. 6 is a schematic diagram of determining an RO based on a WUS according to an embodiment of this application.

For example, FIG. 6 is a schematic diagram of sending a random access preamble. In the schematic diagram, a horizontal axis represents time, and a vertical axis represents frequency. In the schematic diagram, eight WUSs which are sequentially a WUS 0 to a WUS 7 are included. The eight WUSs may be time division multiplexed and frequency division multiplexed. Specifically, frequency multiplexing is used between the WUS 0 to the WUS 3, frequency division multiplexing is used between the WUS 4 to the WUS 7, and time division multiplexing is used between "the WUS 0 to the WUS 3" and "the WUS 4 to the WUS 7". In the schematic diagram, 16 ROs which are sequentially an RO 0 to an RO 15 are further included. The 16 ROs may be time division multiplexed and frequency division multiplexed. Specifically, frequency division multiplexing is used between the RO 0 to the RO 3, frequency division multiplexing is used between the RO 4 to the RO 7, frequency division multiplexing is used between the RO 8 to the RO 11, and frequency division multiplexing is used between the RO 12 to the RO 15. In addition, time division multiplexing is used between "the RO 0 to the RO 3", "the RO 4 to the RO 7", "the RO 8 to the RO 11", and "the RO 12 to the RO 15". There may further be a correspondence between a WUS and an RO. Specifically, the WUS 0 corresponds to the RO 0 and the RO 1, the WUS 1 corresponds to the RO 2 and the RO 3, the WUS 2 corresponds to the RO 4 and the RO 5, the WUS 3 corresponds to the RO 6 and the RO 7, the WUS 4 corresponds to the RO 8 and the RO 9, the WUS 5 corresponds to the RO 10 and the RO 11, the WUS 6 corresponds to the RO 12 and the RO 13, and the WUS 7 corresponds to the RO 14 and the RO 15.

In a possible implementation, the network device may send the eight WUSs whose indexes are sequentially the WUS 0 to the WUS 7, and the eight WUSs have different beam directions. It can be learned from FIG. 6 that, because the terminal device is located in a beam direction of the WUS 3, received signal strength of the received WUS 3 is probably the highest. The terminal device may randomly select an RO from the RO 6 and the RO 7 that correspond to the WUS 3, to send the random access preamble. It should be noted that, in the schematic diagram shown in FIG. 6, an example in which the network device is a gNB and the terminal device is UE is specifically used for description.

Corresponding to the method provided in the foregoing method embodiments, an embodiment of this application further provides a corresponding apparatus. The apparatus includes a corresponding module configured to perform the foregoing embodiments. The module may be software, hardware, or a combination of software and hardware.

Figure 7:
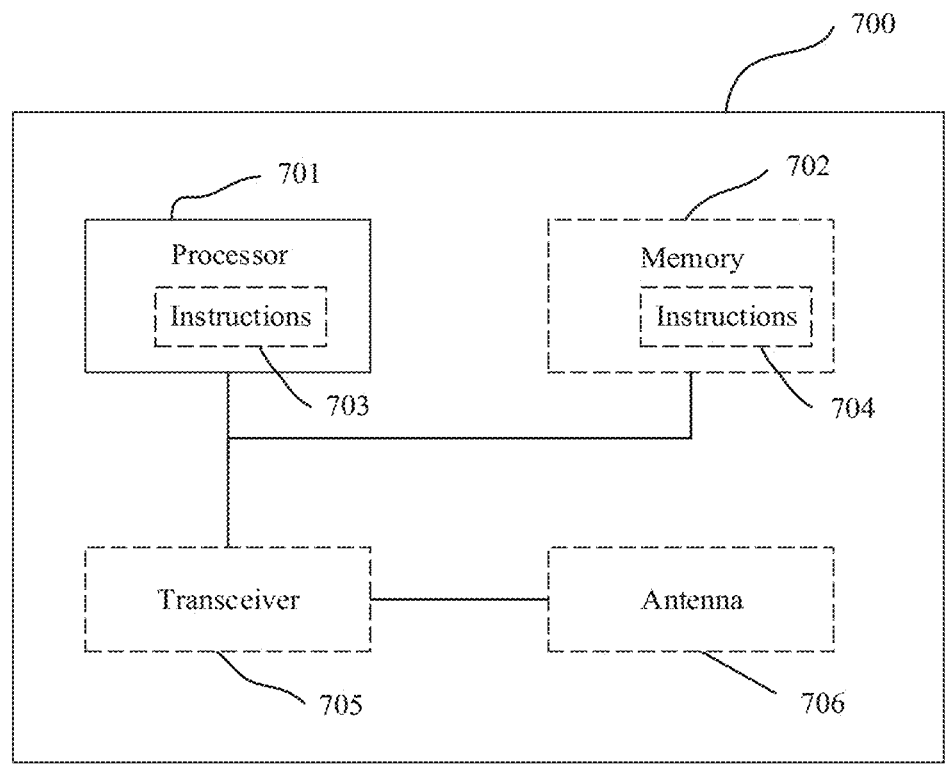
FIG. 7 is a schematic diagram of an apparatus according to an embodiment of this application.

FIG. 7 is a schematic diagram of a structure of an apparatus. The apparatus 700 may be a network device; may be a terminal device; may be a chip, a chip system, a processor, or the like that supports the network device in implementing the foregoing method; or may be a chip, a chip system, a processor, or the like that supports the terminal device in implementing the foregoing method. The apparatus may be configured to implement the method described in the foregoing method embodiments. For details, refer to the descriptions in the foregoing method embodiments.

The apparatus 700 may include one or more processors 701. The processor 701 may also be referred to as a processing unit, and can implement a specific control function. The processor 701 may be a general-purpose processor, a dedicated processor, or the like. For example, the processor 701 may be a baseband processor or a central processing unit. The baseband processor may be configured to process a communication protocol and communication data. The central processing unit may be configured to: control a communication apparatus (for example, a base station, a baseband chip, a terminal, a terminal chip, a DU, or a CU), execute a software program, and process data of the software program.

In an optional design, the processor 701 may alternatively store instructions and/or data 703, and the instructions and/or data 703 may be run by the processor, to enable the apparatus 700 to perform the method described in the foregoing method embodiments.

In another optional design, the processor 701 may include a transceiver unit configured to implement receiving and sending functions. For example, the transceiver unit may be a transceiver circuit, an interface, or an interface circuit. The transceiver circuit, the interface, or the interface circuit configured to implement the receiving and sending functions may be separated, or may be integrated together. The transceiver circuit, the interface, or the interface circuit may be configured to read and write code/data. Alternatively, the transceiver circuit, the interface, or the interface circuit may be configured to transmit or transfer a signal.

In still another possible design, the apparatus 700 may include a circuit, and the circuit may implement the sending, receiving, or communication function in the foregoing method embodiments.

Optionally, the apparatus 700 may include one or more memories 702. The memory may store instructions 704, and the instructions may be run on the processor, so that the apparatus 700 performs the method described in the foregoing method embodiments. Optionally, the memory may further store data. Optionally, the processor may also store instructions and/or data. The processor and the memory may be separately disposed, or may be integrated together. For example, the correspondence described in the foregoing method embodiments may be stored in the memory or stored in the processor.

Optionally, the apparatus 700 may further include a transceiver 705 and/or an antenna 706. The processor 701 may be referred to as a processing unit, and controls the apparatus 700. The transceiver 705 may be referred to as a transceiver unit, a transceiver circuit, a transceiver apparatus, a transceiver module, or the like, and is configured to implement sending and receiving functions.

Optionally, the apparatus 700 in this embodiment of this application may be configured to perform the method described in FIG. 5 in embodiments of this application.

The processor and the transceiver that are described in this application may be implemented on an integrated circuit (IC), an analog IC, a radio frequency integrated circuit (RFIC), a hybrid signal IC, an application-specific integrated circuit (ASIC), a printed circuit board (PCB), an electronic device, or the like. The processor and the transceiver may also be fabricated by using various IC process technologies, for example, a complementary metal oxide semiconductor (CMOS), an n-type metal oxide semiconductor (nMetal-oxide-semiconductor, NMOS), a p-type metal oxide semiconductor (positive channel metal oxide semiconductor, PMOS), a bipolar junction transistor (BJT), a bipolar CMOS (BiCMOS), silicon germanium (SiGe), and gallium arsenide (GaAs).

The apparatus described in the foregoing embodiment may be a network device or a terminal device. However, a range of the apparatus described in this application is not limited thereto, and a structure of the apparatus may not be limited to FIG. 7. The apparatus may be an independent device, or may be a part of a larger device. For example, the apparatus may be:

(1) an independent integrated circuit IC, a chip, or a chip system or subsystem;
(2) a set of one or more ICs, where optionally, the IC set may further include a storage component configured to store data and/or instructions;
(3) an ASIC, for example, a modem (MSM);
(4) a module that can be embedded in another device;
(5) a receiver, a terminal, an intelligent terminal, a cellular phone, a wireless device, a handheld device, a mobile unit, a vehicle-mounted device, a network device, a cloud device, an artificial intelligence device, a machine device, a home device, a medical device, an industrial device, or the like; or
(6) others, or the like.

Figure 8:
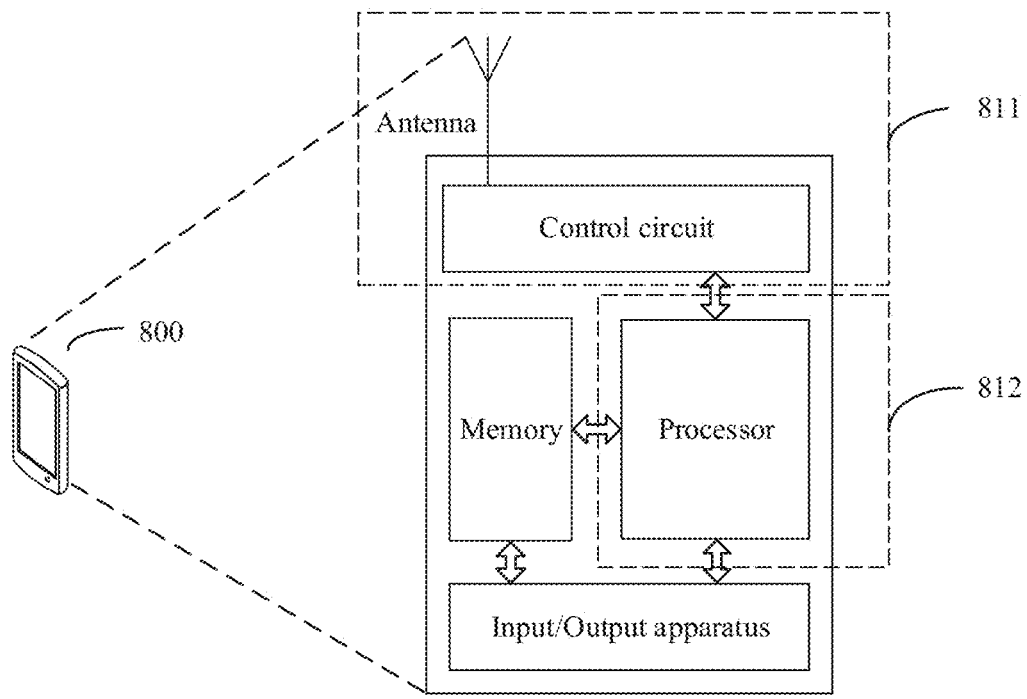
FIG. 8 is a schematic diagram of another apparatus according to an embodiment of this application.

FIG. 8 is a schematic diagram of a structure of a terminal device. The terminal device is applicable to the scenario shown in FIG. 1 or FIG. 2. For ease of description, FIG. 8 shows only main components of the terminal device. As shown in FIG. 8, the terminal device 800 includes a processor, a memory, a control circuit, an antenna, and an input/output apparatus. The processor is mainly configured to: process a communication protocol and communication data, control the entire terminal, execute a software program, and process data of the software program. The memory is mainly configured to store the software program and the data. A radio frequency circuit is mainly configured to: perform conversion between a baseband signal and a radio frequency signal, and process the radio frequency signal. The antenna is mainly configured to send and receive a radio frequency signal in a form of an electromagnetic wave. The input/output apparatus, for example, a touchscreen, a display, or a keyboard, is mainly configured to: receive data entered by a user and output data to the user.

After the terminal device is powered on, the processor may read a software program in a storage unit, parse and execute instructions of the software program, and process data of the software program. When data needs to be sent in a wireless manner, the processor performs baseband processing on the to-be-sent data, and outputs a baseband signal to the radio frequency circuit. The radio frequency circuit processes the baseband signal to obtain a radio frequency signal, and sends the radio frequency signal in a form of an electromagnetic wave through the antenna. When data is sent to the terminal device, the radio frequency circuit receives a radio frequency signal through the antenna, further converts the radio frequency signal into a baseband signal, and outputs the baseband signal to the processor. The processor converts the baseband signal into data, and processes the data.

For ease of description, FIG. 8 shows only one memory and one processor. In an actual terminal device, there may be a plurality of processors and a plurality of memories. The memory may also be referred to as a storage medium, a storage device, or the like. This is not limited in this embodiment of the present application.

In an optional implementation, the processor may include a baseband processor and a central processing unit. The baseband processor is mainly configured to process the communication protocol and the communication data. The central processing unit is mainly configured to: control the entire terminal device, execute the software program, and process the data of the software program. The processor in FIG. 8 integrates functions of the baseband processor and the central processing unit. A person skilled in the art may understand that the baseband processor and the central processing unit may also be independent processors, and are interconnected by using a technology such as a bus. A person skilled in the art may understand that the terminal device may include a plurality of baseband processors to adapt to different network standards, the terminal device may include a plurality of central processing units to enhance a processing capability of the terminal device, and components of the terminal device may be connected by using various buses. The baseband processor may also be expressed as a baseband processing circuit or a baseband processing chip. The central processing unit may also be expressed as a central processing circuit or a central processing chip. A function of processing the communication protocol and the communication data may be built in the processor, or may be stored in the storage unit in a form of a software program. The processor executes the software program to implement a baseband processing function.

In an example, the antenna and the control circuit that have sending and receiving functions may be considered as a transceiver unit 811 of the terminal device 800, and the processor having a processing function may be considered as a processing unit 812 of the terminal device 800. As shown in FIG. 8, the terminal device 800 includes the transceiver unit 811 and the processing unit 812. The transceiver unit may also be referred to as a transceiver, a transceiver apparatus, or the like. Optionally, a component that is in the transceiver unit 811 and that is configured to implement a receiving function may be considered as a receiving unit, and a component that is in the transceiver unit 811 and that is configured to implement a sending function may be considered as a sending unit. In other words, the transceiver unit 811 includes the receiving unit and the sending unit. For example, the receiving unit may also be referred to as a receiver or a receiver circuit, and the sending unit may be referred to as a transmitter or a transmitter circuit. Optionally, the receiving unit and the sending unit may be one integrated unit, or may be a plurality of independent units. The receiving unit and the sending unit may be in one geographical location, or may be distributed in a plurality of geographical locations.

Figure 9:
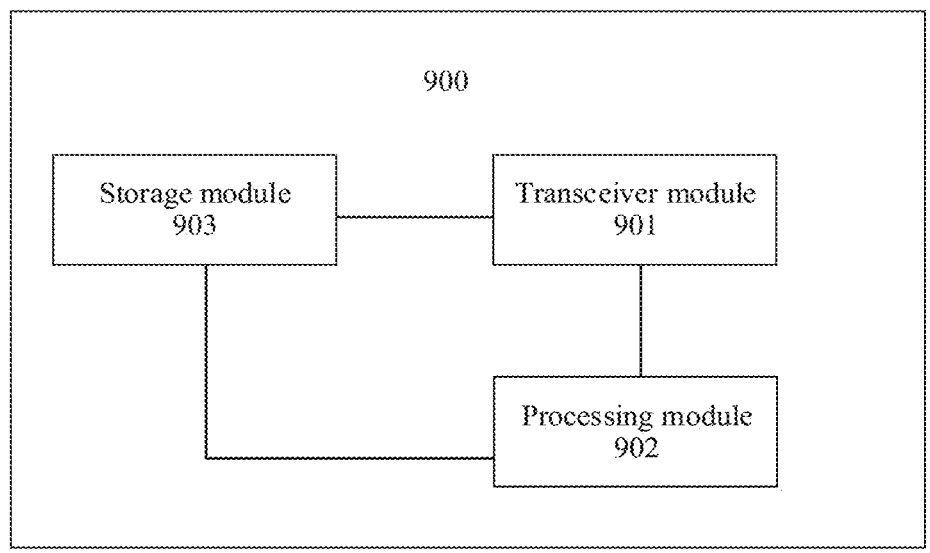
FIG. 9 is a schematic diagram of still another apparatus according to an embodiment of this application.

As shown in FIG. 9, another embodiment of this application provides an apparatus 900. The apparatus may be a terminal, or may be a component (for example, an integrated circuit or a chip) of the terminal. Alternatively, the apparatus may be a network device, or may be a component (for example, an integrated circuit or a chip) of the network device. Alternatively, the apparatus may be another communication module configured to implement the methods in the method embodiments of this application. The apparatus 900 may include a processing module 902 (or referred to as a processing unit). Optionally, the apparatus 900 may further include a transceiver module 901 (or referred to as a transceiver unit) and a storage module 903 (or referred to as a storage unit).

In a possible design, one or more modules in FIG. 9 may be implemented by one or more processors, may be implemented by one or more processors and one or more memories, may be implemented by one or more processors and one or more transceivers, or may be implemented by one or more processors, one or more memories, and one or more transceivers. This is not limited in this embodiment of this application. The processor, the memory, and the transceiver may be disposed separately, or may be integrated.

The apparatus has a function of implementing the terminal described in embodiments of this application. For example, the apparatus includes a corresponding module, unit, or means used for the terminal to perform the steps that are related to the terminal and that are described in embodiments of this application. The function, the unit, or the means may be implemented by software or hardware, may be implemented by hardware executing corresponding software, or may be implemented by a combination of software and hardware. For details, refer to the corresponding descriptions in the foregoing corresponding method embodiments. Alternatively, the apparatus has a function of implementing the network device described in embodiments of this application. For example, the apparatus includes a corresponding module, unit, or means used for the network device to perform the steps that are related to the network device and that are described in embodiments of this application. The function, the unit, or the means may be implemented by software or hardware, may be implemented by hardware executing corresponding software, or may be implemented by a combination of software and hardware. For details, refer to the corresponding descriptions in the foregoing corresponding method embodiments.

Optionally, the modules in the apparatus 900 in this embodiment of this application may be configured to perform the method described in FIG. 5 in embodiments of this application.

In a possible design, the apparatus 900 may include a processing module 902 and a transceiver module 901.

For example, the apparatus 900 may be configured to perform related operations of the terminal device in FIG. 5. The transceiver module 901 is configured to receive a first wake-up signal, where the first wake-up signal is one of K wake-up signals, and K is an integer greater than or equal to 1. The processing module 902 is configured to determine a first random access channel occasion RO, where the first RO is one of N ROs, N is an integer greater than or equal to 1, and there is a correspondence between the first wake-up signal and the N ROs. The transceiver module 901 is further configured to send a random access preamble on the first RO.

Optionally, that there is a correspondence between the first wake-up signal and the N ROs includes one or more of the following: There is a correspondence between a time domain resource of the first wake-up signal and the N ROs; there is a correspondence between a frequency domain resource of the first wake-up signal and the N ROs; there is a correspondence between a code domain resource of the first wake-up signal and the N ROs; there is a correspondence between a spatial domain resource of the first wake-up signal and the N ROs; there is a correspondence between an identifier of the first wake-up signal and the N ROs; or there is a correspondence between a sequence of the first wake-up signal and the N ROs.

Optionally, that there is a correspondence between the first wake-up signal and the N ROs includes one or more of the following: The first wake-up signal is quasi-co-located with a first synchronization signal block SSB, and there is a correspondence between the first SSB and the N ROs; the first wake-up signal is quasi-co-located with a first channel state information-reference signal CSI-RS, and there is a correspondence between the first CSI-RS and the N ROs; or the first wake-up signal is quasi-co-located with a first demodulation reference signal DMRS, and there is a correspondence between the first DMRS and the N ROs.

Optionally, that the first wake-up signal is one of K wake-up signals includes one or more of the following: The first wake-up signal is a wake-up signal whose received signal power is the highest in the K wake-up signals; the first wake-up signal is one of wake-up signals whose received signal power is greater than or equal to a first threshold in the K wake-up signals; the first wake-up signal is a wake-up signal whose received signal strength is the highest in the K wake-up signals; the first wake-up signal is one of wake-up signals whose received signal strength is greater than or equal to a second threshold in the K wake-up signals; the first wake-up signal is a wake-up signal whose received signal quality is the highest in the K wake-up signals; or the first wake-up signal is one of wake-up signals whose received signal quality is greater than or equal to a third threshold in the K wake-up signals.

Optionally, that K is an integer greater than or equal to 1 is specifically: K is an integer greater than or equal to 2.

Optionally, the K wake-up signals occupy different frequency domain resources, or the K wake-up signals occupy different time domain resources.

Optionally, the first wake-up signal is used to indicate to monitor, on a paging occasion, downlink control information used for paging, or the first wake-up signal is used to indicate whether to monitor, on a paging occasion, downlink control information used for paging.

For another example, the apparatus 900 may be configured to perform related operations on the network device side in the procedure shown in FIG. 5. The processing module 902 is configured to generate a first wake-up signal, where the first wake-up signal is one of K wake-up signals, and K is an integer greater than or equal to 1. The transceiver module 901 is configured to send the first wake-up signal. The transceiver module 901 is further configured to receive a random access preamble on a first random access channel occasion RO, where the first RO is one of N ROs, N is an integer greater than or equal to 1, and there is a correspondence between the first wake-up signal and the N ROs.

Optionally, that there is a correspondence between the first wake-up signal and the N ROs includes one or more of the following: There is a correspondence between a time domain resource of the first wake-up signal and the N ROs; there is a correspondence between a frequency domain resource of the first wake-up signal and the N ROs; there is a correspondence between a code domain resource of the first wake-up signal and the N ROs; there is a correspondence between a spatial domain resource of the first wake-up signal and the N ROs; there is a correspondence between an identifier of the first wake-up signal and the N ROs; or there is a correspondence between a sequence of the first wake-up signal and the N ROs.

Optionally, that there is a correspondence between the first wake-up signal and the N ROs includes one or more of the following: The first wake-up signal is quasi-co-located with a first synchronization signal block SSB, and there is a correspondence between the first SSB and the N ROs; the first wake-up signal is quasi-co-located with a first channel state information-reference signal CSI-RS, and there is a correspondence between the first CSI-RS and the N ROs; or the first wake-up signal is quasi-co-located with a first demodulation reference signal DMRS, and there is a correspondence between the first DMRS and the N ROs.

Optionally, that the first wake-up signal is one of K wake-up signals includes one or more of the following: The first wake-up signal is a wake-up signal whose received signal power is the highest in the K wake-up signals; the first wake-up signal is one of wake-up signals whose received signal power is greater than or equal to a first threshold in the K wake-up signals; the first wake-up signal is a wake-up signal whose received signal strength is the highest in the K wake-up signals; the first wake-up signal is one of wake-up signals whose received signal strength is greater than or equal to a second threshold in the K wake-up signals; the first wake-up signal is a wake-up signal whose received signal quality is the highest in the K wake-up signals; or the first wake-up signal is one of wake-up signals whose received signal quality is greater than or equal to a third threshold in the K wake-up signals.

Optionally, that K is an integer greater than or equal to 1 includes: K is an integer greater than or equal to 2.

Optionally, the K wake-up signals occupy different frequency domain resources, or the K wake-up signals occupy different time domain resources.

Optionally, the first wake-up signal is used to indicate to monitor, on a paging occasion, downlink control information used for paging, or the first wake-up signal is used to indicate whether to monitor, on a paging occasion, downlink control information used for paging.

It may be understood that, in some scenarios, some optional features in embodiments of this application may be independently implemented without depending on another feature, for example, a solution on which the optional features are currently based, to resolve a corresponding technical problem and achieve a corresponding effect. Alternatively, in some scenarios, the optional features are combined with other features based on requirements. Correspondingly, an apparatus provided in embodiments of this application may also correspondingly implement these features or functions. Details are not described herein.

A person skilled in the art may further understand that various illustrative logical blocks and steps that are listed in embodiments of this application may be implemented by using electronic hardware, computer software, or a combination thereof. Whether the functions are implemented by using hardware or software depends on particular applications and a design requirement of an entire system. A person skilled in the art may use various methods to implement the functions for corresponding application, but it should not be considered that the implementation goes beyond the scope of embodiments of this application.

It may be understood that, the processor in embodiments of this application may be an integrated circuit chip, and has a signal processing capability. In an implementation process, the steps in the foregoing method embodiments may be completed by using a hardware integrated logic circuit in the processor or instructions in a form of software. The foregoing processor may be a general-purpose processor, a digital signal processor (DSP), an application-specific integrated circuit (ASIC), a field programmable gate array (FPGA) or another programmable logic device, a discrete gate or transistor logic device, or a discrete hardware component.

The solutions described in this application may be implemented in various manners. For example, these technologies may be implemented by using hardware, software, or a combination of hardware and software. For hardware implementation, a processing unit configured to perform these technologies at a communication apparatus (for example, a base station, a terminal, a network entity, or a chip) may be implemented in one or more general-purpose processors, a DSP, a digital signal processing device, an ASIC, a programmable logic device, an FPGA, or another programmable logic apparatus, a discrete gate or transistor logic device, a discrete hardware component, or any combination thereof. The general-purpose processor may be a microprocessor. Optionally, the general-purpose processor may alternatively be any conventional processor, controller, microcontroller, or state machine. The processor may alternatively be implemented by a combination of computing apparatuses, such as a digital signal processor and a microprocessor, a plurality of microprocessors, one or more microprocessors in combination with a digital signal processor core, or any other similar configuration.

It may be understood that, in embodiments of this application, the memory may be a transitory memory or a non-transitory memory, or may include both a transitory memory and a non-transitory memory. The non-transitory memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The transitory memory may be a random access memory (RAM), used as an external cache. By way of example but not limitation, many forms of RAMs are available, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct Rambus random access memory (direct Rambus RAM, DR RAM). It should be noted that the memory of the system and method described in this specification includes but is not limited to these memories and any memory of another proper type.

This application further provides a computer-readable medium. The computer-readable medium stores a computer program. When the computer program is executed by a computer, functions of any one of the foregoing method embodiments are implemented.

This application further provides a computer program product. When the computer program product is executed by a computer, functions of any one of the foregoing method embodiments are implemented.

All or some of the foregoing embodiments may be implemented by using software, hardware, firmware, or any combination thereof. When software is used for implementation, all or some of embodiments may be implemented in a form of a computer program product. The computer program product includes one or more computer instructions. When the computer instructions are loaded and executed on a computer, all or some of the procedures or functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

It may be understood that "an embodiment" mentioned in the entire specification means that particular features, structures, or characteristics related to the embodiment are included in at least one embodiment of this application. Therefore, embodiments in the entire specification are not necessarily same embodiments. In addition, these particular features, structures, or characteristics may be combined in one or more embodiments in any proper manner. It may be understood that sequence numbers of the foregoing processes do not mean an execution sequence in various embodiments of this application. The execution sequence of the processes should be determined based on functions and internal logic of the processes, and should not be construed as any limitation on the implementation processes of embodiments of this application.

It may be understood that, in this application, "when" and "if" mean that an apparatus performs corresponding processing in an objective situation, but do not constitute a limitation on time, do not require that the apparatus have a determining action during implementation, and do not mean any other limitation.

"Simultaneously" in this application may be understood as being at a same time point, may be understood as being within a time period, or may be understood as being within a same periodicity.

A person skilled in the art may understand that first, second, and various reference numerals in this application are for distinguishing only for ease of description, and are not used to limit the scope of embodiments of this application. A specific value of a numeral (which may also be referred to as an index), a specific value of a quantity, and a location in this application are merely used as an example, but are not unique representation forms, and are not used to limit the scope of embodiments of this application. First, second, and various reference numerals in this application are also for distinguishing only for ease of description, and are not used to limit the scope of embodiments of this application.

In this application, unless otherwise specified, an element represented in a singular form is intended to represent "one or more", but is not intended to represent "one and only one". In this application, unless otherwise specified, "at least one" is intended to represent "one or more", and "a plurality of" is intended to represent "two or more".

In addition, the terms "system" and "network" are usually used interchangeably in this specification. The term "and/or" in this specification describes only an association relationship for describing associated objects and represents that three relationships may exist. For example, A and/or B may represent the following three cases: only A exists, both A and B exist, and only B exists. A may be singular or plural, and B may be singular or plural. The character "/" usually indicates an "or" relationship between the associated objects.

The term "at least one of" in this specification indicates all or any combination of listed items. For example, "at least one of A, B, and C" may indicate the following six cases: Only A exists, only B exists, only C exists, both A and B exist, both B and C exist, and A, B and C all exist. A may be singular or plural, B may be singular or plural, and C may be singular or plural.

It may be understood that, in embodiments of this application, "B corresponding to A" indicates that B is associated with A, and B may be determined based on A. However, it should be further understood that determining B based on A does not mean that B is determined based only on A, that is, B may alternatively be determined based on A and/or other information.

The correspondences shown in the tables in this application may be configured, or may be predefined. Values of the information in the tables are merely examples, and other values may be configured. This is not limited in this application. When a correspondence between information and each parameter is configured, not all correspondences shown in the tables need to be configured. For example, in the tables in this application, correspondences shown in some rows may alternatively not be configured. For another example, proper deformations and adjustments such as splitting and combination may be performed based on the foregoing tables. Names of the parameters shown in titles of the foregoing tables may alternatively be other names that can be understood by a communication apparatus, and values or representation manners of the parameters may alternatively be other values or representation manners that can be understood by the communication apparatus. During implementation of the foregoing tables, another data structure, such as an array, a queue, a container, a stack, a linear table, a pointer, a linked list, a tree, a graph, a structure, a class, a pile, or a hash table, may alternatively be used.

"Predefine" in this application may be understood as "define", "store", "pre-store", "pre-negotiate", "pre-configure", "solidify", or "pre-burn".

A person of ordinary skill in the art may understand that units and algorithm steps in the examples described with reference to embodiments disclosed in this specification can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

A person of ordinary skill in the art may understand that, for a purpose of convenient and brief descriptions, for a detailed working process of the foregoing system, apparatus, and unit, refer to a corresponding process in the foregoing method embodiments. Details are not described herein again.

It may be understood that the system, apparatus, and method described in this application may alternatively be implemented in another manner. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate. Parts displayed as units may or may not be physical units, to be specific, may be located in one position, or may be distributed on a plurality of network units. Some or all of the units may be selected based on an actual requirement to achieve the objectives of the solutions of embodiments.

In addition, functional units in embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for indicating a computer device (which may be a personal computer, a server, or a network device) to perform all or some of the steps in the method described in embodiments of this application. The foregoing storage medium includes: any medium that can store program code, such as a USB flash drive, a removable hard disk, a read-only memory (ROM), a random access memory (RAM), a magnetic disk, or an optical disc.

For same or similar parts in embodiments of this application, refer to each other. In embodiments of this application and the implementations/implementation methods in embodiments, unless otherwise specified or a logical conflict occurs, terms and/or descriptions are consistent and may be mutually referenced between different embodiments and between the implementations/implementation methods in embodiments. Technical features in the different embodiments and the implementations/implementation methods in embodiments may be combined to form a new embodiment, implementation, or implementation method according to an internal logical relationship thereof. The foregoing implementations of this application do not constitute a limitation on the protection scope of this application.

The foregoing descriptions are merely specific implementations of this application, but are not intended to limit the protection scope of this application. Any variation or replacement readily figured out by a person skilled in the art within the technical scope disclosed in this application shall fall within the protection scope of this application.

What is claimed is:

1. A communication method, comprising:
receiving a first wake-up signal, wherein the first wake-up signal is one of K wake-up signals, and K is an integer greater than or equal to 1;
determining a first random access channel occasion (RO), wherein the first RO is one of N ROs, N is an integer greater than or equal to 1, and there is a correspondence between the first wake-up signal and the N RO, wherein there is a correspondence between the N ROs and an identifier of the first wake-up signal; and
sending a random access preamble on the first RO.

2. The method according to claim 1, wherein that there is a correspondence between the first wake-up signal and the N ROs comprises one or more of the following:
the first wake-up signal is quasi-co-located with a first synchronization signal block (SSB), and there is a correspondence between the first SSB and the N ROs;
the first wake-up signal is quasi-co-located with a first channel state information-reference signal (CSI-RS), and there is a correspondence between the first CSI-RS and the N ROs; or
the first wake-up signal is quasi-co-located with a first demodulation reference signal (DMRS), and there is a correspondence between the first DMRS and the N ROs.

3. The method according to claim 1, wherein that the first wake-up signal is one of K wake-up signals comprises one or more of the following:
the first wake-up signal is a wake-up signal whose received signal power is the highest in the K wake-up signals;
the first wake-up signal is one of wake-up signals whose received signal power is greater than or equal to a first threshold in the K wake-up signals;
the first wake-up signal is a wake-up signal whose received signal strength is the highest in the K wake-up signals;
the first wake-up signal is one of wake-up signals whose received signal strength is greater than or equal to a second threshold in the K wake-up signals;
the first wake-up signal is a wake-up signal whose received signal quality is the highest in the K wake-up signals; or
the first wake-up signal is one of wake-up signals whose received signal quality is greater than or equal to a third threshold in the K wake-up signals.

4. The method according to claim 1, wherein K is an integer greater than or equal to 2.

5. The method according to claim 4, wherein the K wake-up signals occupy different frequency domain resources, or the K wake-up signals occupy different time domain resources.

6. The method according to claim 1, wherein the first wake-up signal indicates to monitor, on a paging occasion, downlink control information used for paging, or the first wake-up signal indicates whether to monitor, on a paging occasion, downlink control information used for paging.

7. An apparatus, comprising:
one or more processors; and
a memory coupled to the one or more processors, wherein the memory stores instructions to be executed by the one or more processors, and wherein the instructions, when executed by the one or more processors, instructs the one or more processors to perform operations comprising:
receiving a first wake-up signal, wherein the first wake-up signal is one of K wake-up signals, and K is an integer greater than or equal to 1;
determining a first random access channel occasion (RO), wherein the first RO is one of N ROs, N is an integer greater than or equal to 1, and there is a correspondence between the first wake-up signal and the N ROs, wherein there is a correspondence between the N ROs and an identifier of the first wake-up signal; and
sending a random access preamble on the first RO.

8. The apparatus according to claim 7, wherein that there is a correspondence between the first wake-up signal and the N ROs comprises one or more of the following:
the first wake-up signal is quasi-co-located with a first synchronization signal block (SSB), and there is a correspondence between the first SSB and the N ROs;
the first wake-up signal is quasi-co-located with a first channel state information-reference signal (CSI-RS), and there is a correspondence between the first CSI-RS and the N ROs; or
the first wake-up signal is quasi-co-located with a first demodulation reference signal (DMRS), and there is a correspondence between the first DMRS and the N ROs.

9. The apparatus according to claim 7, wherein that the first wake-up signal is one of K wake-up signals comprises one or more of the following:
the first wake-up signal is a wake-up signal whose received signal power is the highest in the K wake-up signals;
the first wake-up signal is one of wake-up signals whose received signal power is greater than or equal to a first threshold in the K wake-up signals;
the first wake-up signal is a wake-up signal whose received signal strength is the highest in the K wake-up signals;
the first wake-up signal is one of wake-up signals whose received signal strength is greater than or equal to a second threshold in the K wake-up signals;
the first wake-up signal is a wake-up signal whose received signal quality is the highest in the K wake-up signals; or
the first wake-up signal is one of wake-up signals whose received signal quality is greater than or equal to a third threshold in the K wake-up signals.

10. The apparatus according to claim 7, wherein K is an integer greater than or equal to 2.

11. The apparatus according to claim 10, wherein the K wake-up signals occupy different frequency domain resources, or the K wake-up signals occupy different time domain resources.

12. The apparatus according to claim 7, wherein the first wake-up signal indicates to monitor, on a paging occasion, downlink control information used for paging, or the first wake-up signal indicates whether to monitor, on a paging occasion, downlink control information used for paging.

13. A non-transitory computer readable medium storing instructions that, when executed by one or more processors, instructs the one or more processors to perform operations comprising:
receiving a first wake-up signal, wherein the first wake-up signal is one of K wake-up signals, and K is an integer greater than or equal to 1;

determining a first random access channel occasion (RO), wherein the first RO is one of N ROs, N is an integer greater than or equal to 1, and there is a correspondence between the first wake-up signal and the N ROs, wherein there is a correspondence between the N ROs and an identifier of the first wake-up signal; and sending a random access preamble on the first RO.

14. The non-transitory computer readable medium according to claim 13, wherein that there is a correspondence between the first wake-up signal and the N ROs comprises one or more of the following:

the first wake-up signal is quasi-co-located with a first synchronization signal block (SSB), and there is a correspondence between the first SSB and the N ROs;

the first wake-up signal is quasi-co-located with a first channel state information-reference signal (CSI-RS), and there is a correspondence between the first CSI-RS and the N ROs; or the first wake-up signal is quasi-co-located with a first demodulation reference signal (DMRS), and there is a correspondence between the first DMRS and the N ROs.

15. The non-transitory computer readable medium according to claim 13, wherein that the first wake-up signal is one of K wake-up signals comprises one or more of the following:

the first wake-up signal is a wake-up signal whose received signal power is the highest in the K wake-up signals;

the first wake-up signal is one of wake-up signals whose received signal power is greater than or equal to a first threshold in the K wake-up signals;

the first wake-up signal is a wake-up signal whose received signal strength is the highest in the K wake-up signals;

the first wake-up signal is one of wake-up signals whose received signal strength is greater than or equal to a second threshold in the K wake-up signals;

the first wake-up signal is a wake-up signal whose received signal quality is the highest in the K wake-up signals; or the first wake-up signal is one of wake-up signals whose received signal quality is greater than or equal to a third threshold in the K wake-up signals.

16. The non-transitory computer readable medium according to claim 13, wherein K is an integer greater than or equal to 2.

17. The non-transitory computer readable medium according to claim 13, wherein the first wake-up signal indicates to monitor, on a paging occasion, downlink control information used for paging, or the first wake-up signal indicates whether to monitor, on a paging occasion, downlink control information used for paging.

18. The non-transitory computer readable medium according to claim 16, wherein the K wake-up signals occupy different frequency domain resources, or the K wake-up signals occupy different time domain resources.

* * * * *